United States Patent
Olsen

(10) Patent No.: US 6,641,288 B1
(45) Date of Patent: Nov. 4, 2003

(54) REAR WARNING LIGHT SYSTEM FOR TRAILERED VEHICLES

(76) Inventor: Dee Wade Olsen, 1070 Hoytsville Rd., Coalville, UT (US) 84017

( * ) Notice: Subject to any disclaimer, the term of this patent is extended or adjusted under 35 U.S.C. 154(b) by 19 days.

(21) Appl. No.: 09/590,638

(22) Filed: Jun. 8, 2000

(51) Int. Cl.[7] .............................. B60Q 1/00; F21V 29/00
(52) U.S. Cl. ....................... 362/485; 362/477; 362/544; 362/549
(58) Field of Search .................. 362/485, 477, 362/544, 548, 549, 249, 250, 543, 227, 389, 382; 340/468; 114/361; 150/166, 167; 248/205.3, 205.4, 291.1

(56) References Cited

U.S. PATENT DOCUMENTS

| | | | |
|---|---|---|---|
| 4,380,793 A | * | 4/1983 | Potts .......................... 362/548 |
| 5,044,044 A | * | 9/1991 | Young et al. .................. 16/323 |
| 5,537,302 A | * | 7/1996 | Hillstrom et al. ........... 362/249 |
| 5,631,628 A | | 5/1997 | Solis, Jr. |
| 5,719,552 A | | 2/1998 | Thompson |
| 5,725,228 A | * | 3/1998 | Livingston ............... 280/414.1 |
| 5,736,926 A | | 4/1998 | Winholtz |
| 5,760,545 A | | 6/1998 | Mikel |
| 5,798,691 A | | 8/1998 | Kao |
| 5,831,523 A | | 11/1998 | Lange |
| 5,847,513 A | | 12/1998 | Host |
| 5,847,646 A | | 12/1998 | Mucciacciaro |
| 5,915,798 A | | 6/1999 | Ford |

* cited by examiner

Primary Examiner—Sandra O'Shea
Assistant Examiner—Bao Truong
(74) Attorney, Agent, or Firm—Mallinckrodt & Mallinckrodt; Robert R. Mallinckrodt

(57) ABSTRACT

A removable rear warning light system for attachment to a vehicle, such as a boat or snowmobile, carried on a trailer pulled by a motor vehicle to provide warning to the drivers of motor vehicles approaching from the rear. The warning light system includes a pod removably mountable on a rear portion of the trailered vehicle attachable to the electrical system of the motor vehicle to work in unison with one or more light functions of the motor vehicle. The pod fits within a boat cover having a flexible, water repellant sheet of such configuration as to cover the upper portion of a trailered vehicle.

32 Claims, 22 Drawing Sheets

REAR WARNING LIGHT SYSTEM FOR TRAILERED VEHICLES

BACKGROUND OF THE INVENTION

1. Field

Figure 1:
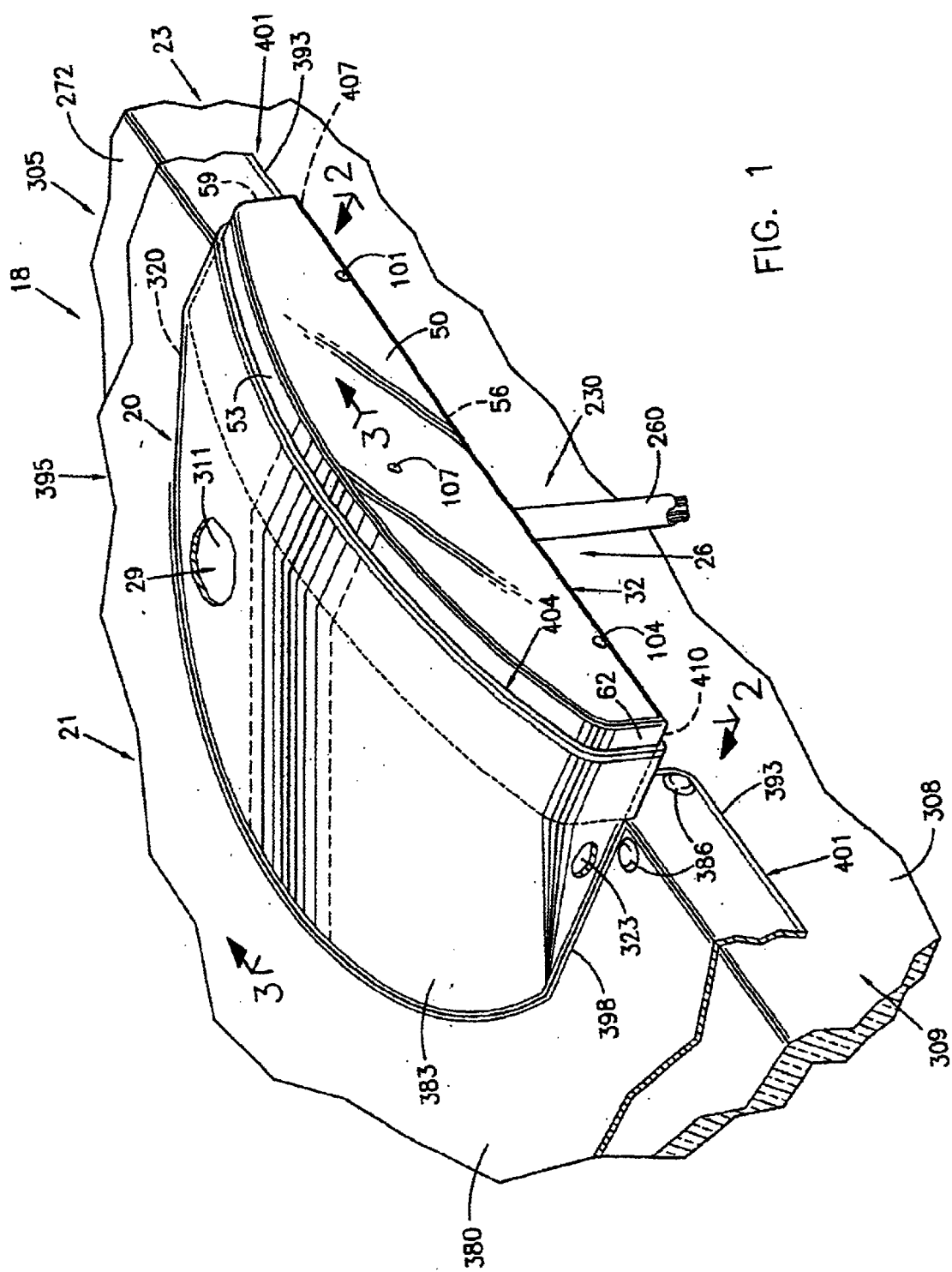

The invention is in the field of rear warning lights for trailers of the type connected for synchronized operation with the lights of a towing motor vehicle, and more specifically rear warning lights which are mounted to a vehicle carried on the trailer.

2. State of the Art

Warning lights such as brake signals, turn signals, parking or running lights, and back-up lights are used on motor vehicles and trailers to warn the drivers of trailing motor vehicles of the intentions of the driver of the motor vehicle. Such warning lights, while effective on most motor vehicles, leave something to be desired on trailers. For example, most trailer warning lights are of a fairly small size and positioned relatively close to the ground such that visibility thereof is limited. Larger warning lights positioned at a higher level would significantly increase the visibility of such warning lights such as in low visibility fog conditions and when rounding a hill wherein low mounted lights might be blocked by the surface of the road. Additionally, such prior art warning lights are typically rather plain and unattractive looking, with the light passing portion typically being of round construction, rather than modern looking and streamlined in construction.

In U.S. Pat. No. 5,631,628 issued to Solis, Jr. is disclosed a safety brake light for high profile vehicles such as the trailers of tractor trailer rigs. The brake light comprises a housing of an elongate, triangular configuration which houses a plurality of light bulbs which shine through a translucent rear cover, being activated by the tractor's brake system. Two pairs of brake lights are mounted to the sides of the trailer adjacent the rear thereof, one brake light of each pair on each side, one pair being at a vertical position at the eye level of the drivers of passenger vehicles and the other pair at the eye level of the drivers of trucks and buses, for improved visibility thereof. The brake lights are meant to be permanently mounted to the trailer rather than being easily removable by hand.

In U.S. Pat. No. 5,725,228 issued to Livingston is disclosed a trailered vehicle, such as a boat, which includes an integral rear light which is powered in concert with the lights of the towing motor vehicle by means of a concealed electric cable which extends the length of the trailered vehicle from the rear light terminating at a connector which connects to the electrical system of the motor vehicle. Alternatively, the electrical cable and plug can be eliminated, wherein the rear light includes a radio control receiver powered by the trailered vehicle, and the motor vehicle include a radio control transmitter connected to the electrical system of the towing motor vehicle which transmits a signal to the receiver to control the rear light. The rear light is designed and built into the trailered vehicle rather than being easily added at a later time and therefore not designed to be easily removable.

In U.S. Pat. No. 5,847,646 issued to Mucciacciaro is disclosed a brake warning light which is removable, but designed for use inside a motor vehicle rather than mounted on the trailer. The warning light comprises a rectangular housing having a broad planar wall or face through which is cut a stenciled warning with a colored transparent plate within the housing immediately adjacent the wall or face. The housing mounts to the inside of the rear window of the motor vehicle, such as an automobile, by means of a plurality of suction cups. A brake light and a strobe light are contained within the housing which are electrically connected to the brake system of the motor vehicle. The brake light illuminates upon application of the motor vehicle brakes in a conventional fashion with the strobe light being activated a predetermined time after brake actuation for a preset period of time then deactivates.

There is a need for an improved rear warning light system for trailered vehicles which can be attached to existing vehicles without any or significant modification of the vehicle, versions of which are quickly and easily removable.

SUMMARY OF THE INVENTION

The invention is a rear warning light system for attachment to a vehicle or other such structure carried on a trailer towed by a motor vehicle. The warning light system can be connected to the electrical system of the motor vehicle to work in unison with one or more light functions thereof to warn the drivers of motor vehicles approaching the rear of the trailered structure of the intentions of the driver ahead.

The warning light system comprises a pod mountable on a rear portion of the trailered structure having a casing with a shell having a light-passing rear portion, means for producing light within the casing typically including a plurality of light bulbs in sockets mounted therein so as to shine through the light passing rear portion, and means for mounting the casing to the rear portion of the trailered structure.

The light producing means can operate independently of the electrical system of the motor vehicle, such as by being battery powered, but typically works in unison with one or more light functions of the motor vehicle such as by being connected thereto by means of an electrical cord having an electrical plug to which are connected a plurality of individual insulated electrical wires covered by a common outer jacket or sleeve, which plug is removably connectable directly to the electrical system of the motor vehicle or indirectly thereto such as through the electrical system of the trailer. The light producing means can include brake light means which work in unison with the brake lights of the motor vehicle, turn signal means which operate in unison with the turn signals of the motor vehicle, and specialty light means which operate in unison with at least one light function of the motor vehicle such as running light means which operate in unison with the running lights of the vehicle and back-up light means which operate in unison with the back-up lights of the motor vehicle.

The pod permanently connects, or removably connects to the rear portion of the trailered structure such as for temporary use during trailering of a boat or other such vehicle. The casing mounting means typically removably connects the casing to the rear portion of the trailered structure by utilizing at least one pair of patches of mating hook and loop fastener material, one of the patches of the pair which adhesively attaches to the rear portion of the trailered structure and the other of the patches of the pair which adhesively attaches to the casing.

The pod can also be mounted to the trailered structure, such as to the transom of a boat, by means of the casing having a plurality of holes which longitudinally extend through at least a portion thereof, and a plurality of bolt means which extend therethrough into the rear of the trailered structure.

The casing is typically watertight while allowing access thereinto, such as by including an access door which connects to the shell with a sealing means therebetween. The access door is typically hingedly connected to the shell, with the sealing means comprising a gasket which fits between the access door and the shell.

The warning light system can further comprise a hood which is connectable to the casing, and a hood mounting means for mounting the hood to the rear portion of the trailered structure forward of the casing. The hood typically comprises a top wall and a plurality of side walls downwardly dependent therefrom, the side walls typically being vertically tapered such that the hood is of a generally hollowed, streamlined wedge shape. The hood is typically movable relative to the casing such as by being hingedly connected to the shell though it can be integral therewith. The break away pieces of the tapered side walls of the hood are of a tapered configuration.

The hood mounting means typically removably connects the hood to the rear portion of the trailered structure rather than permanently mounting thereto, such as by utilizing at least one pair of patches of mating hook and loop fastener material, one of the patches of the pair which adhesively attaches to the rear portion of the trailered structure and the other of the patches of the pair which adhesively attaches to the hood.

The warning light system can be of adjustable height so as to custom fit the rear portion of the particular trailered structure such as by means of utilizing mounting means which is of adjustable height and a hood having side walls which include at least one lower break-away edge piece wherein the mounting means can be adjusted to the desired height and the break-away edge pieces can be removed as needed to conform thereto. The adjustable height mounting means typically comprises a plurality of L-shaped brackets each of which include a vertically oriented slot and which are attachable to the casing using a hardware means.

The warning light system can include an auxiliary power cord electrically connected to the light producing means, which power cord comprises a pair of individual insulated electrical wires covered by a sleeve, and an electrical socket at a free end thereof for connection to a mating electrical plug for supplying six or twelve volt D.C. electrical current to an electrical device such as a battery charger or air pump, the power cord and socket being stowable within the hood during periods of non-use.

The warning light system can further comprise a standard type boat cover or one specially adapted for use therewith, such as comprising a flexible, water repellant or waterproof sheet of such configuration as to cover part or all of the upper portion of a trailered structure, and a plurality of fastener means, such as female snap fastener halves, affixed thereto about an outer periphery thereof which are mateable with fastener means, such as male snap fastener halves, affixed to an outer periphery of the trailered structure to removably retain the sheet thereto.

The pod can be permanently, or removably connected to the rear portion of the sheet such as in a pocket formed in the sheet, the electrical cord thereof which can extend from the pod separate from the boat cover, or which electrical cord can extend along and be attached to the sheet extending outwardly from the front portion of the sheet such that the plug is attachable to the electrical system of the motor vehicle.

The electrical cord can be divided into first, middle, and second end portions containing the respective individual insulated electrical wires, the individual wires of the first end portion being connected to the light producing means and to respective fastener means of the boat cover at a rear portion thereof, the individual wires of the second end portion being connected to the electrical plug and to respective fastener means of the boat cover at a front portion thereof, and the individual wires of the middle portion being connected to corresponding fastener means at the front and rear of the trailered structure so as to span the length of the trailered structure. When the boat cover is assembled to the boat, electrical connection is made between the electrical plug and the light producing means of the pod, through the respective individual wires of the cord and the fastener means, to operate the light producing means in unison with one or more light functions of the motor vehicle.

THE DRAWINGS

Figure 2:
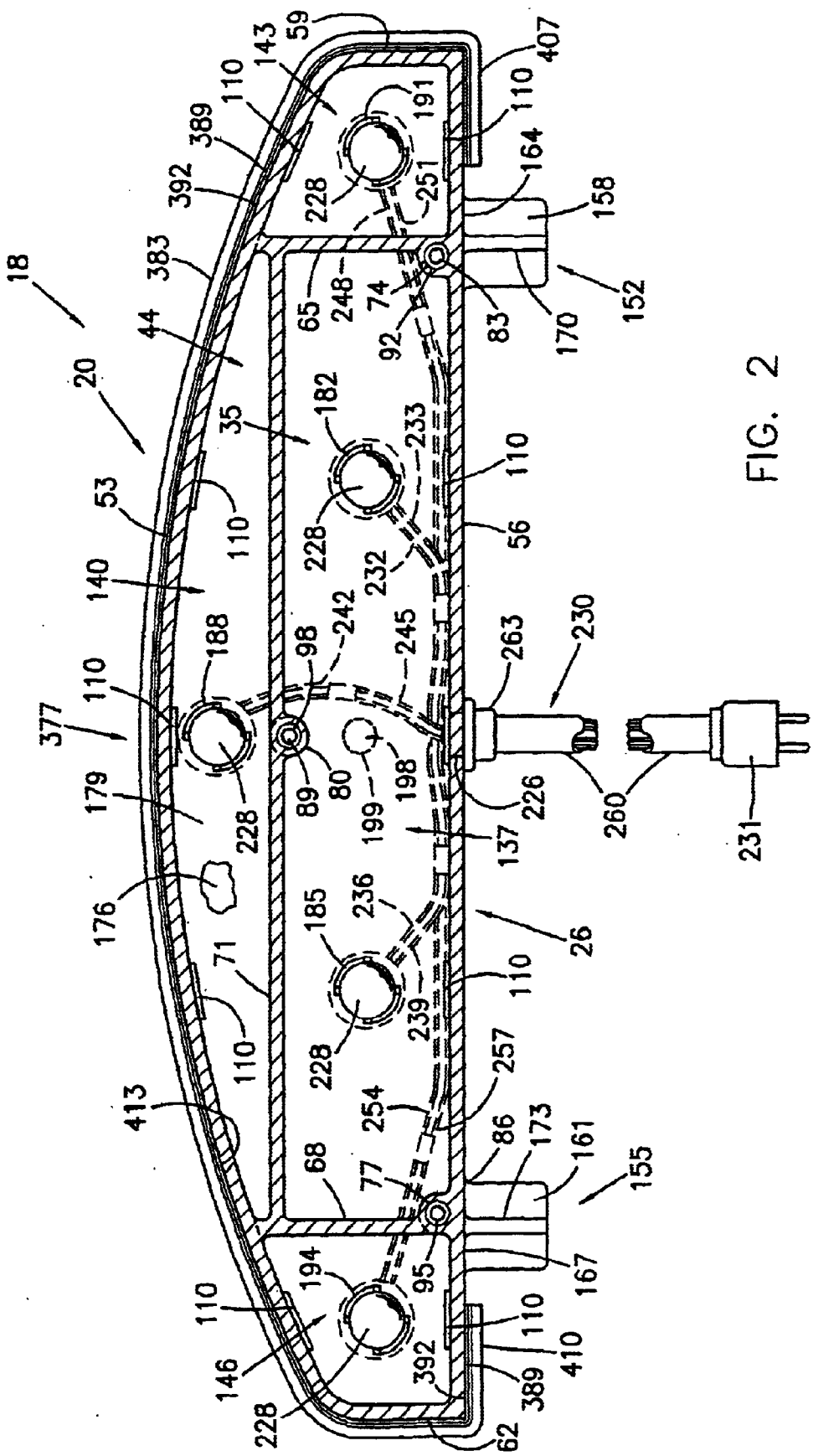
Figure 3:
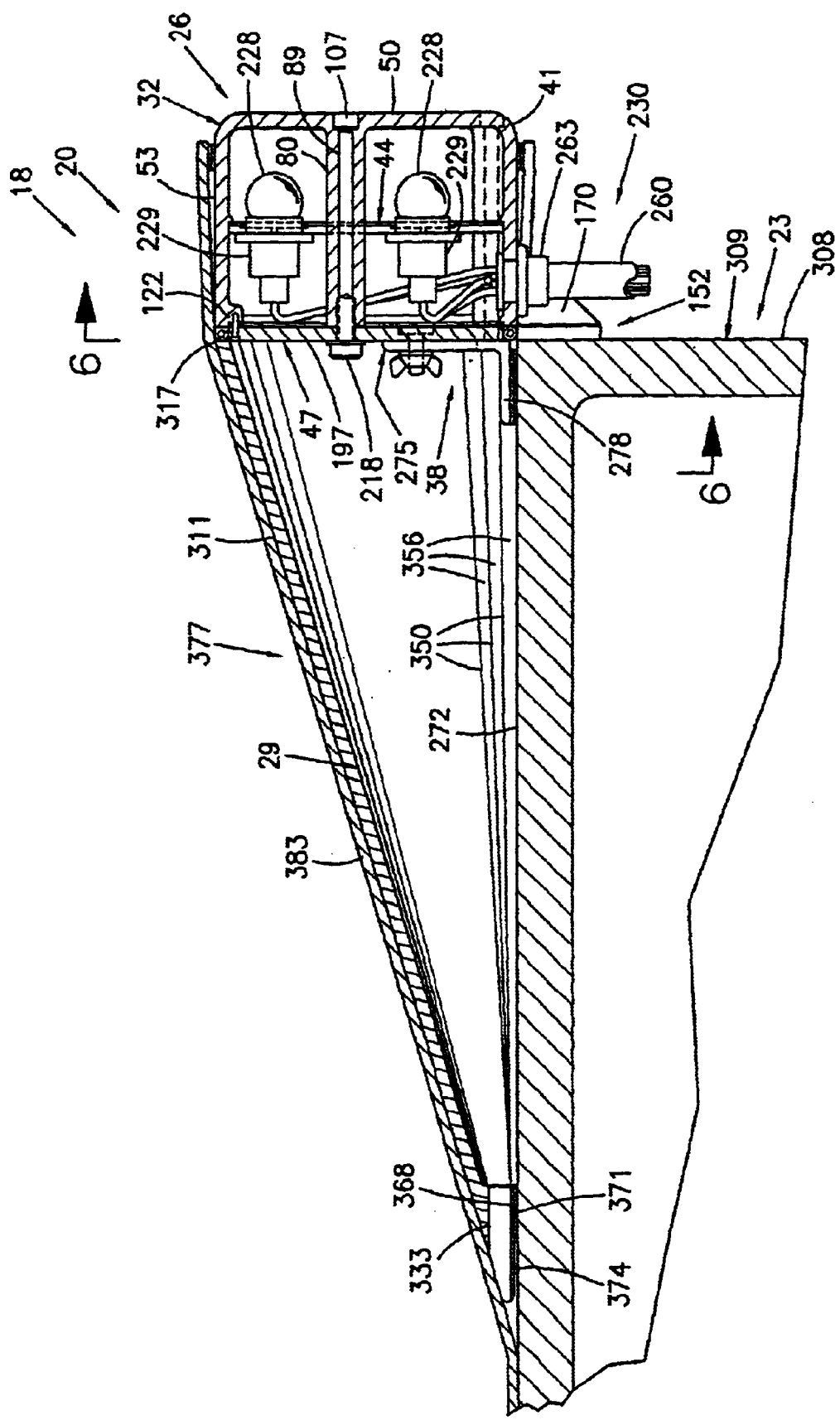
Figure 4:
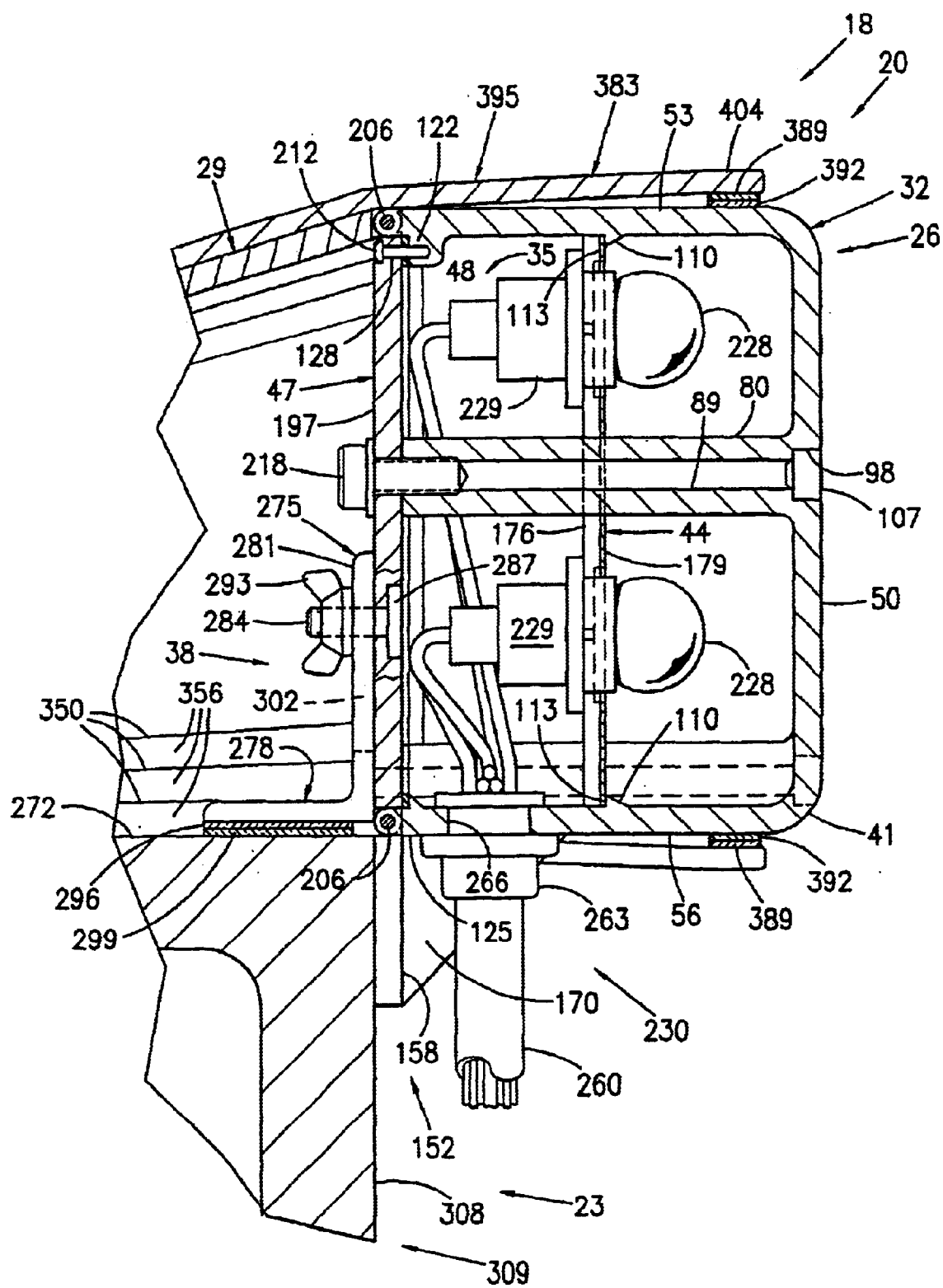
Figure 5:
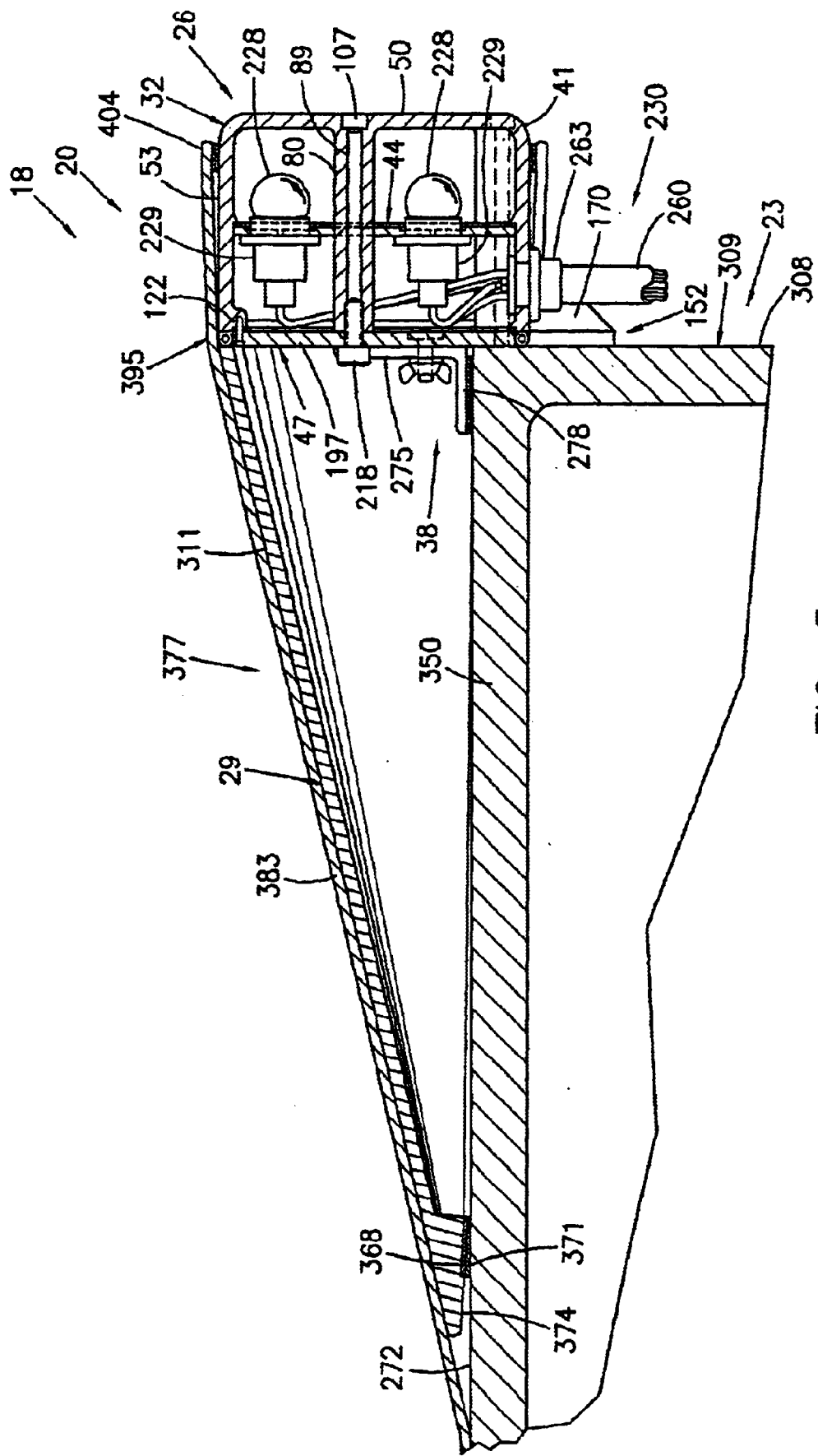
Figure 6:
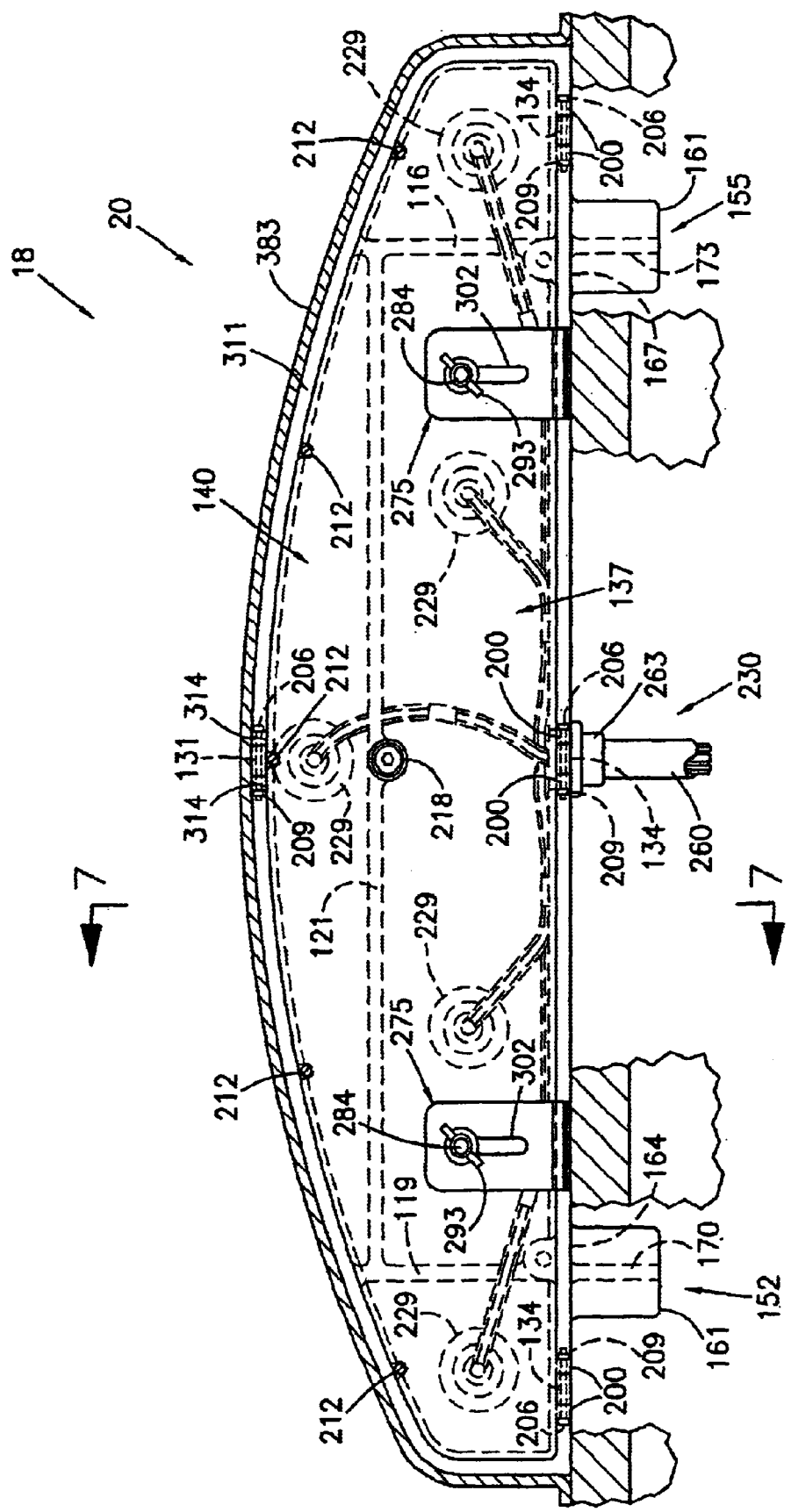
Figure 7:
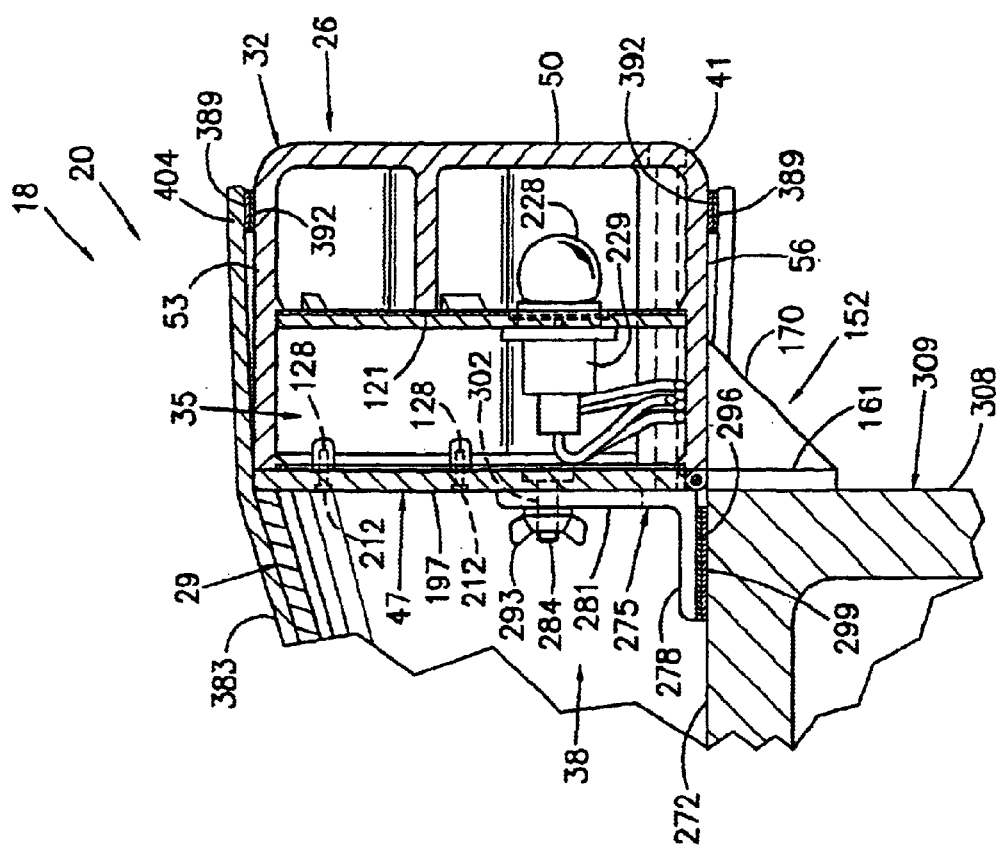
Figure 11:
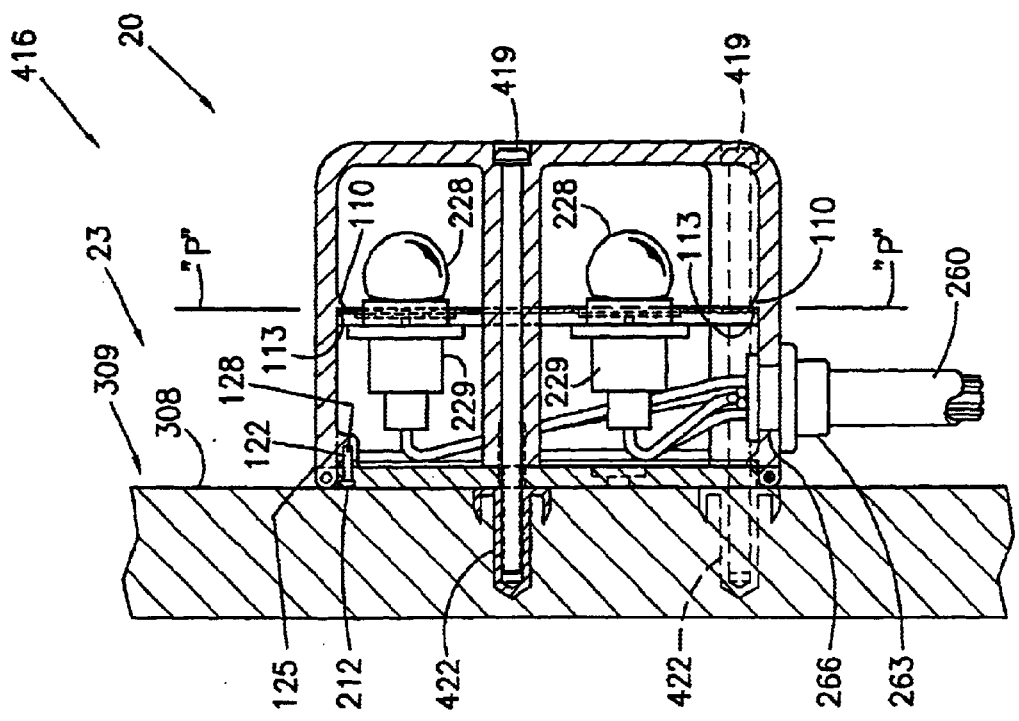
Figure 8:
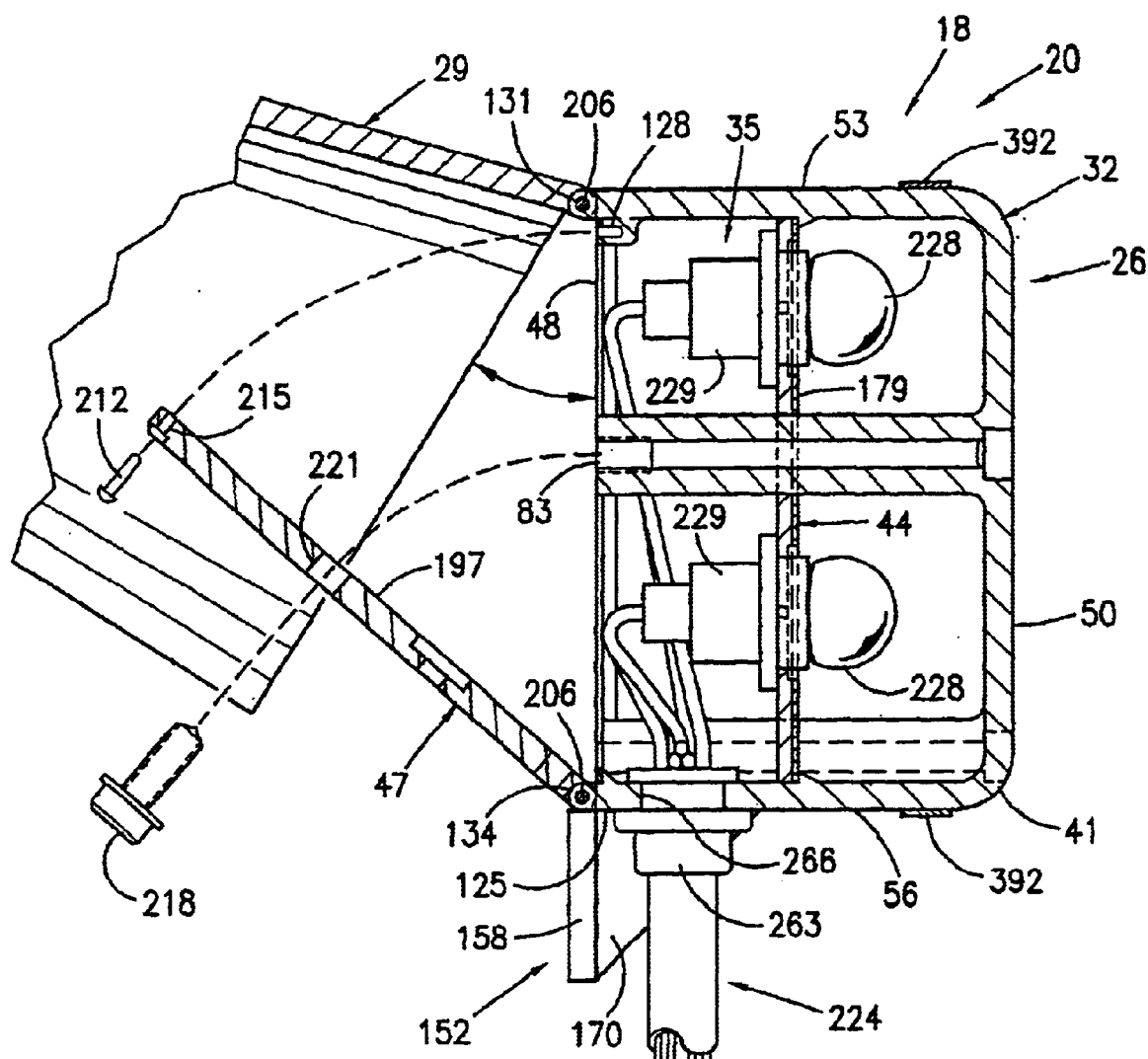
Figure 9:
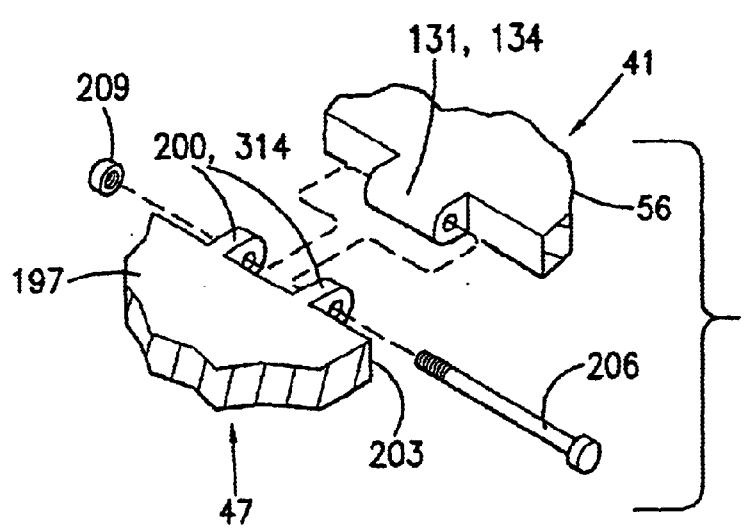
Figure 10:
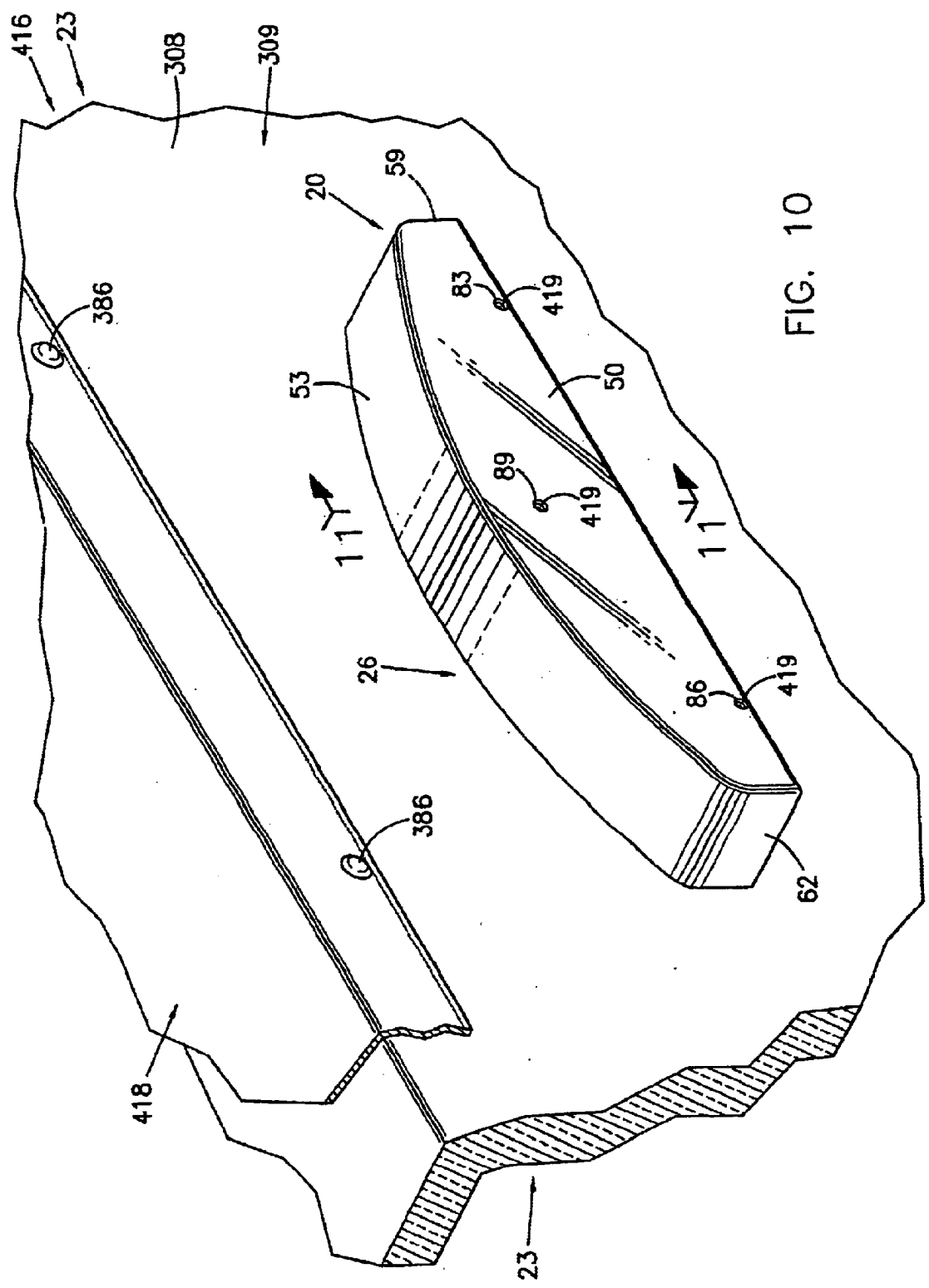
Figure 12:
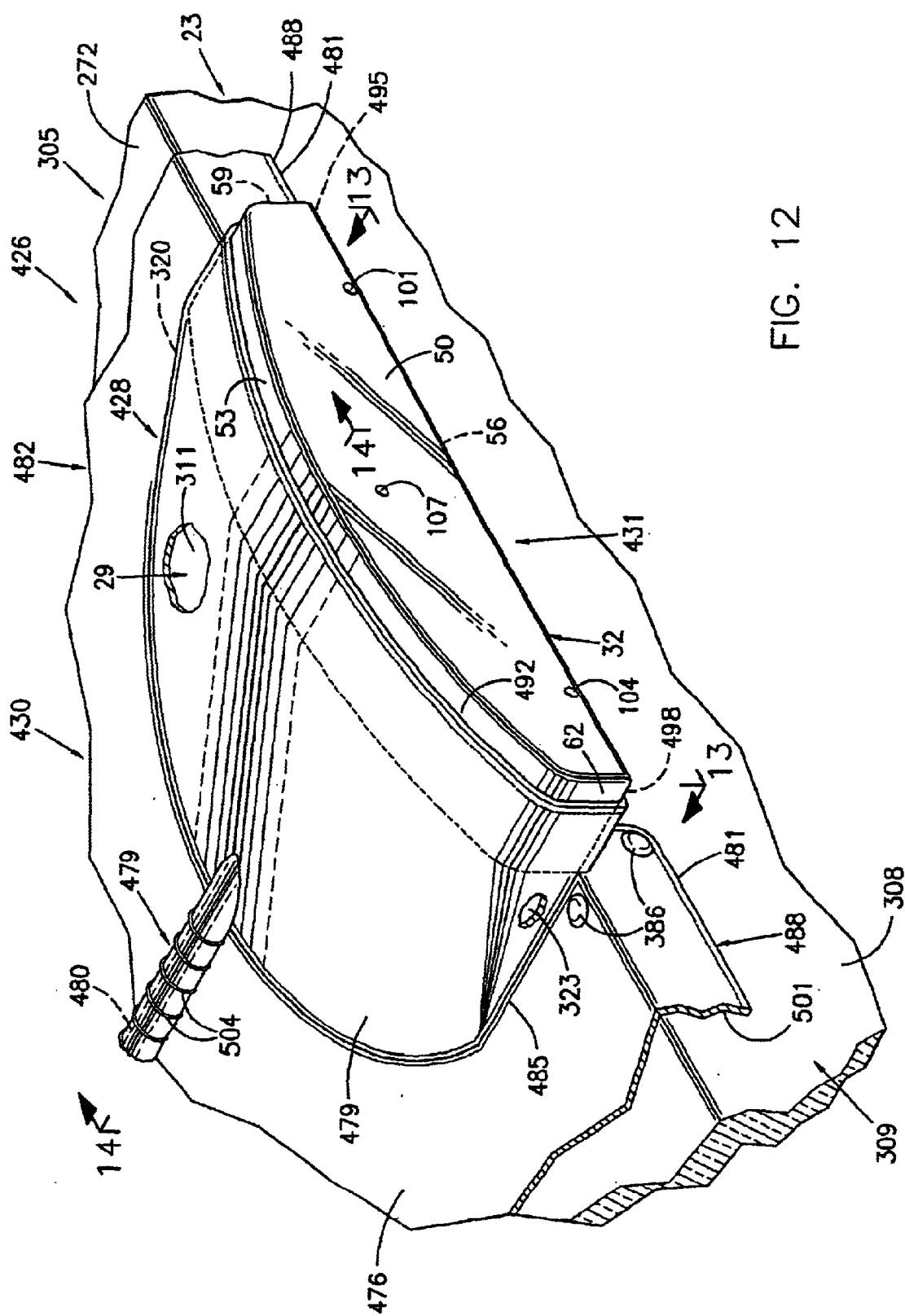
Figure 13:
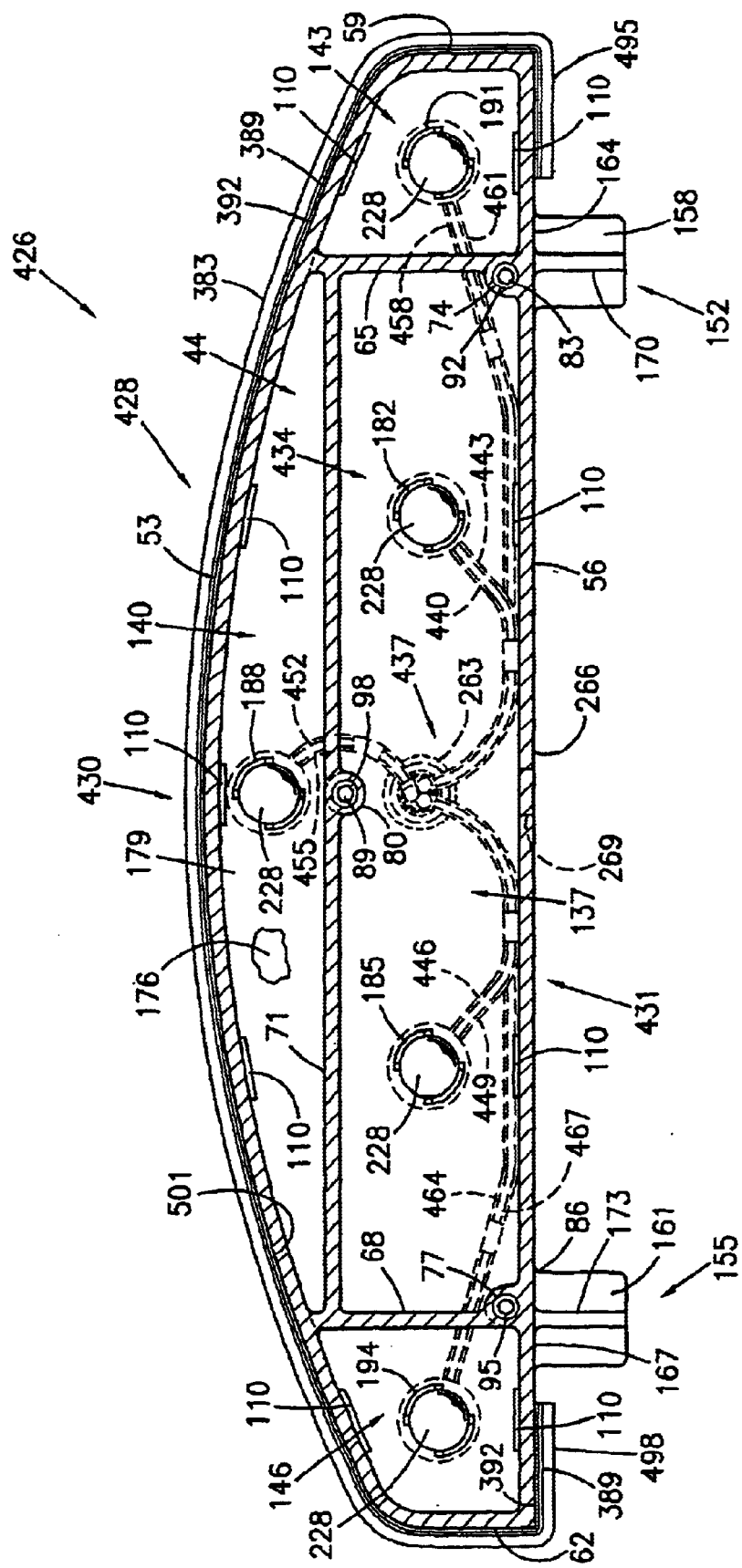
Figure 14:
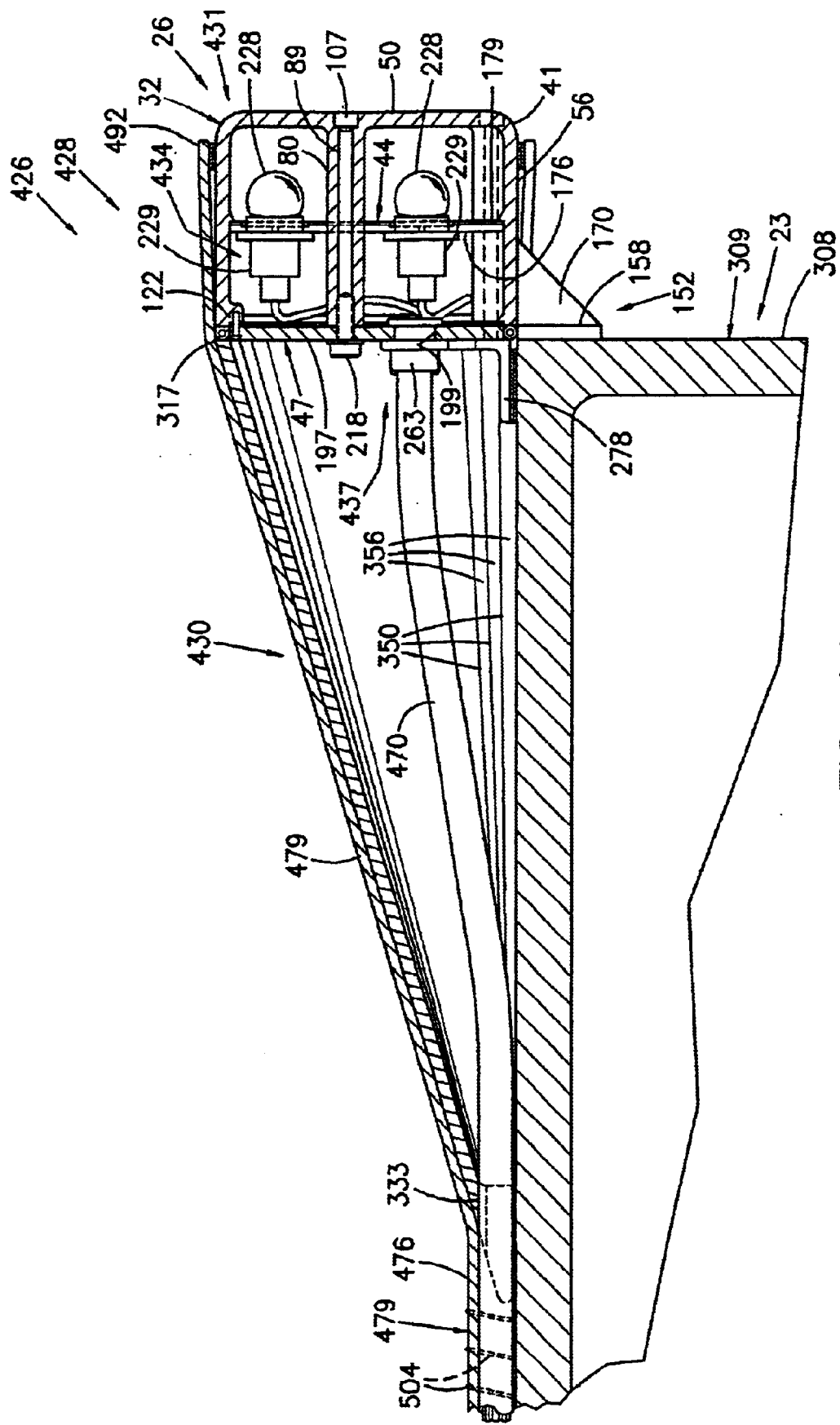
Figure 15:
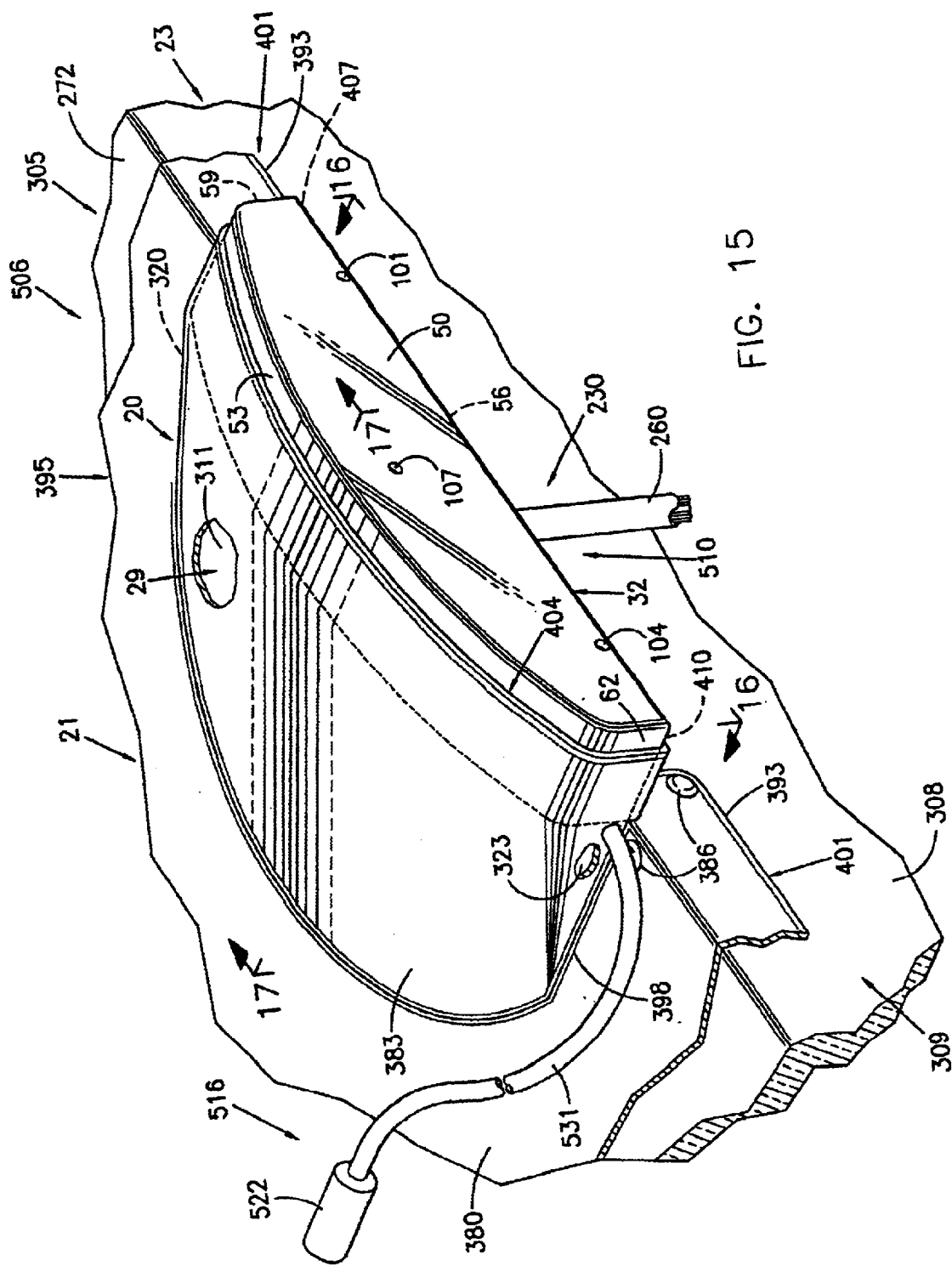
Figure 16:
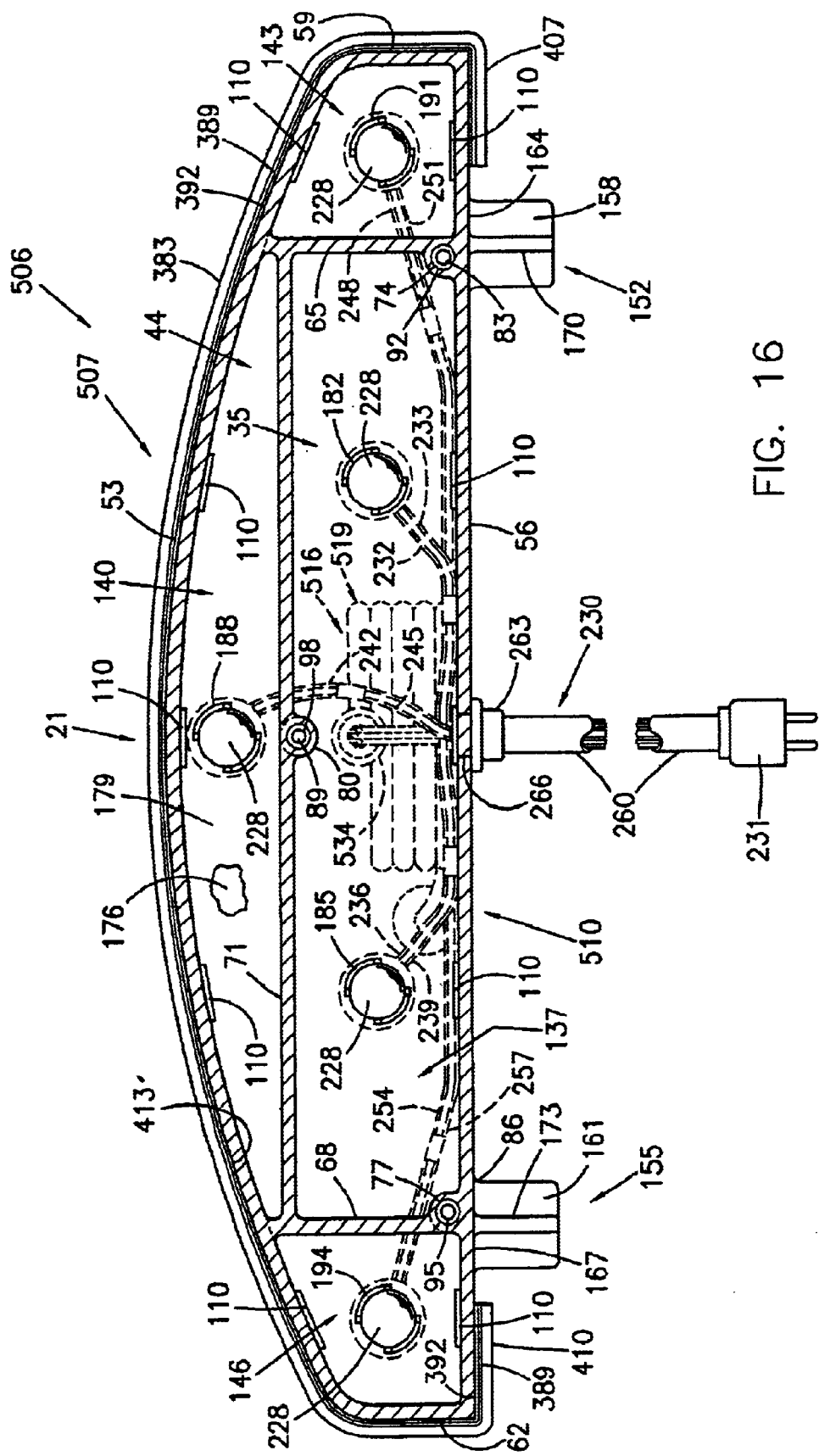
Figure 17:
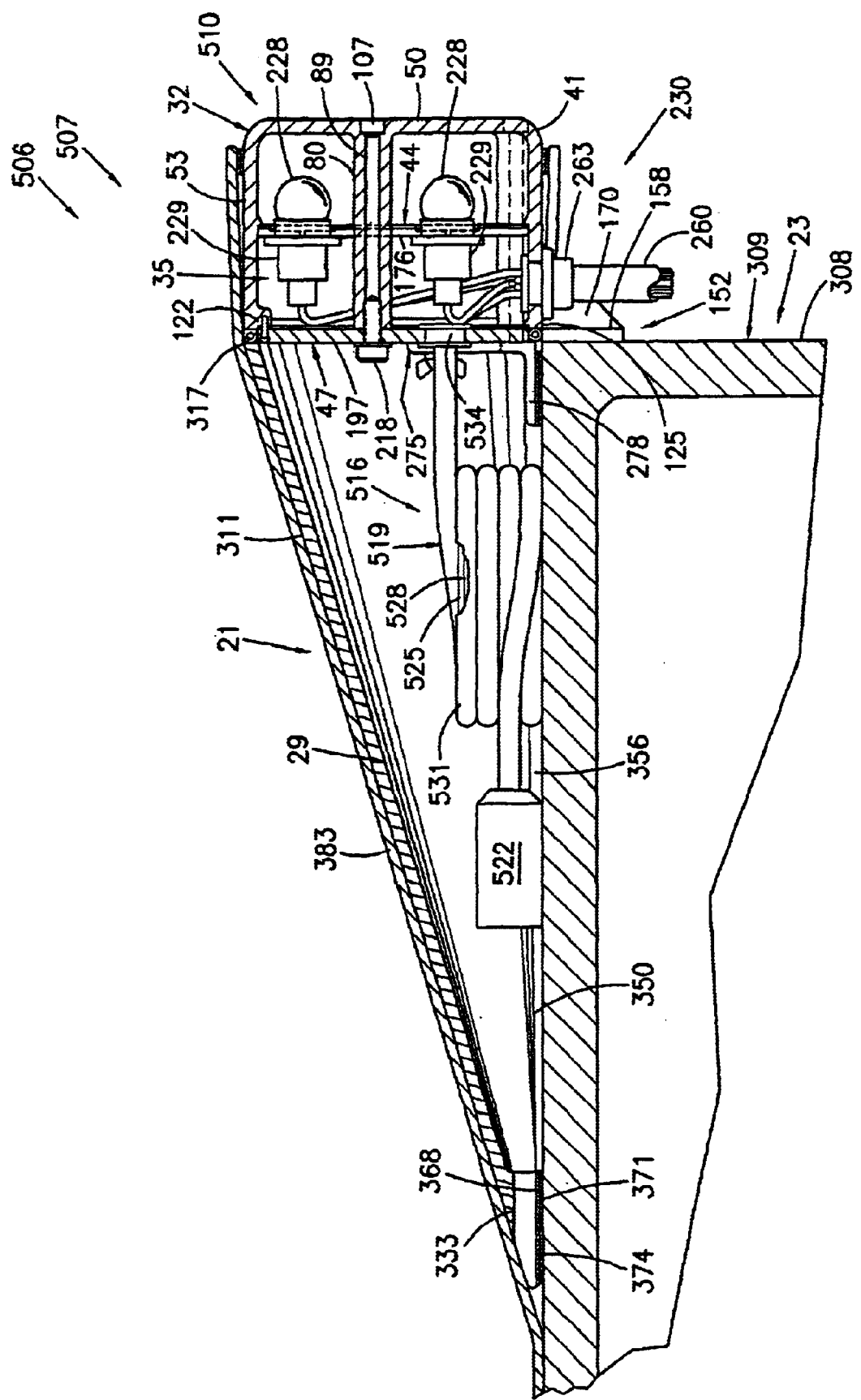
Figure 18:
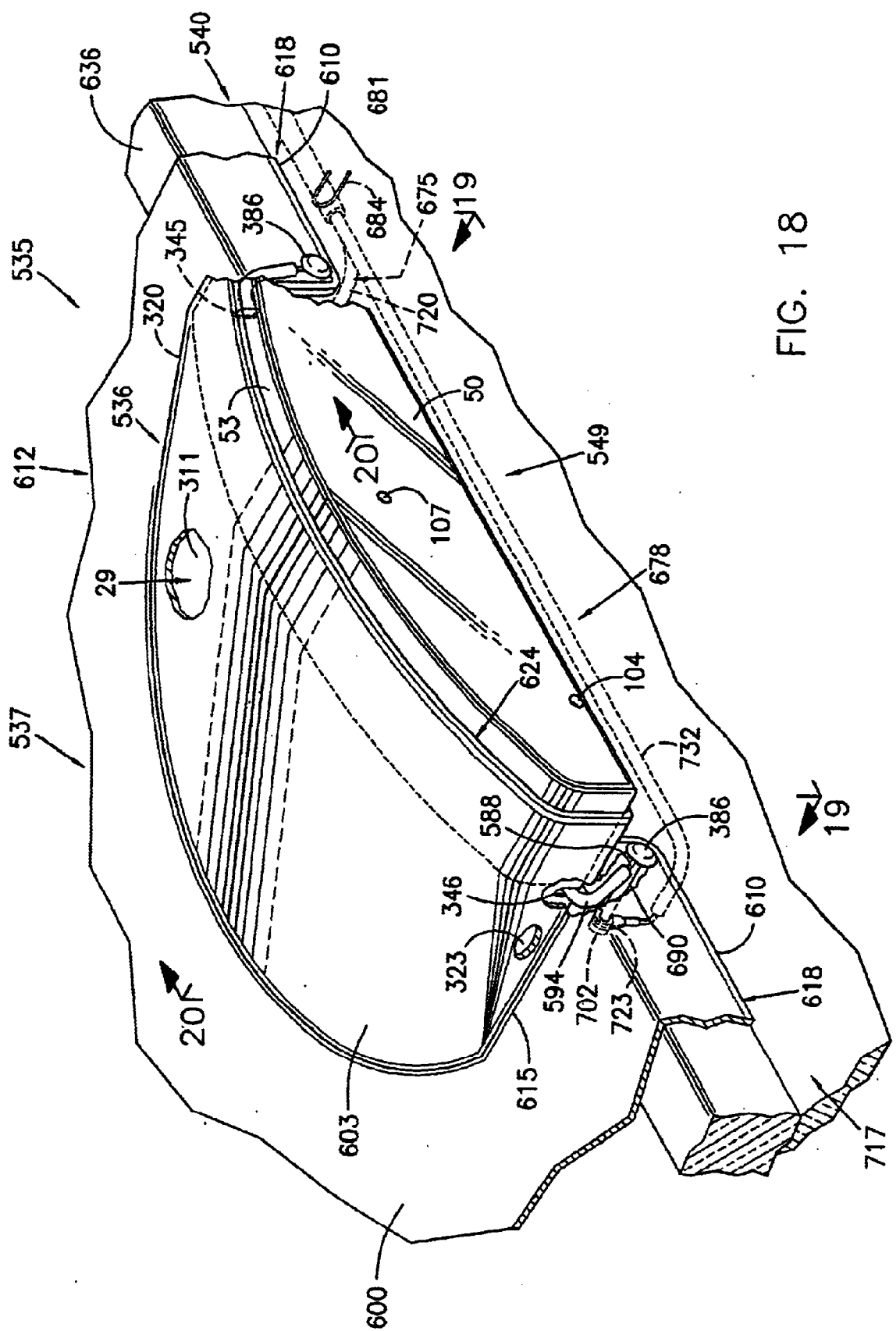
Figure 19:
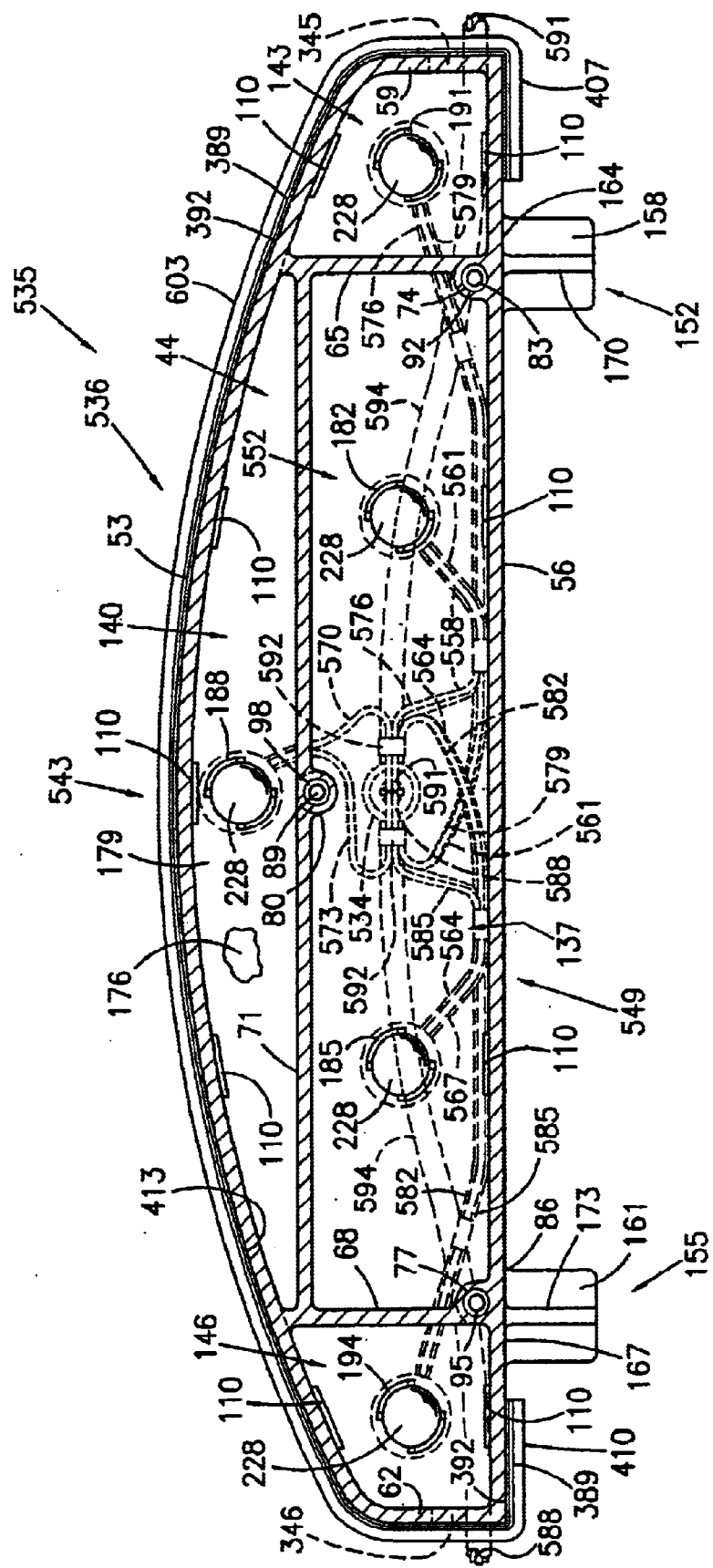
Figure 20:
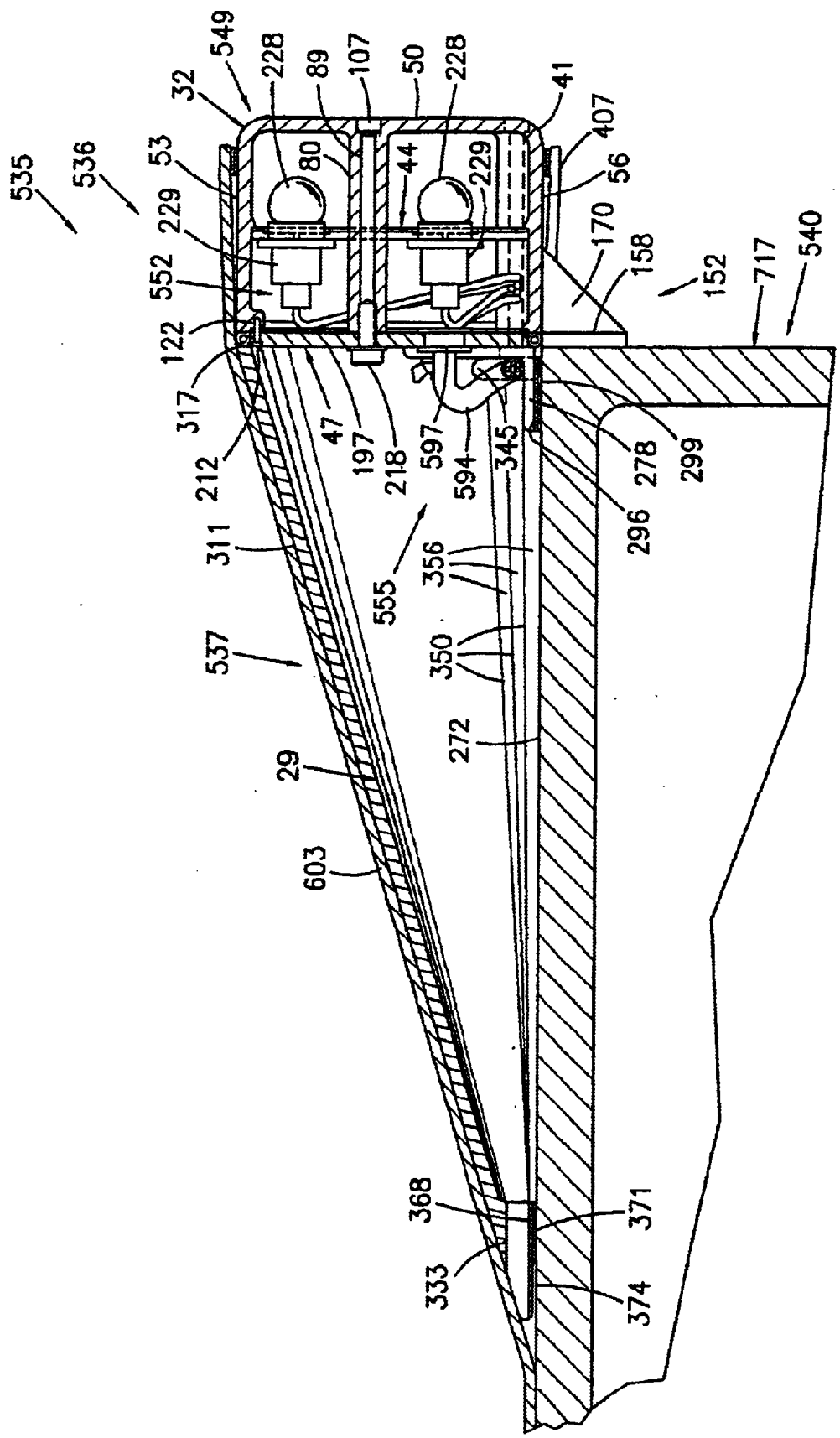
Figure 21:
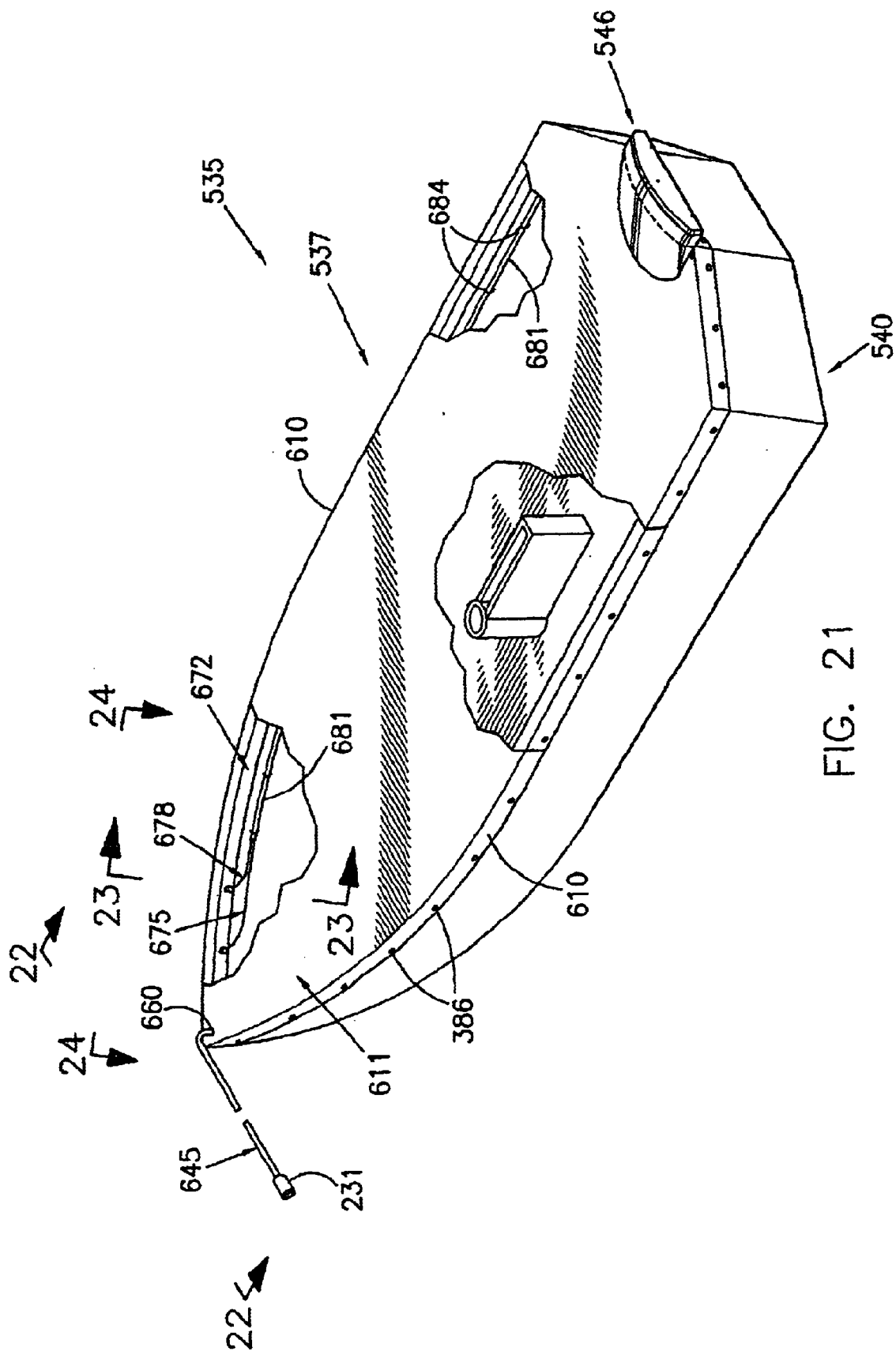
Figure 22:
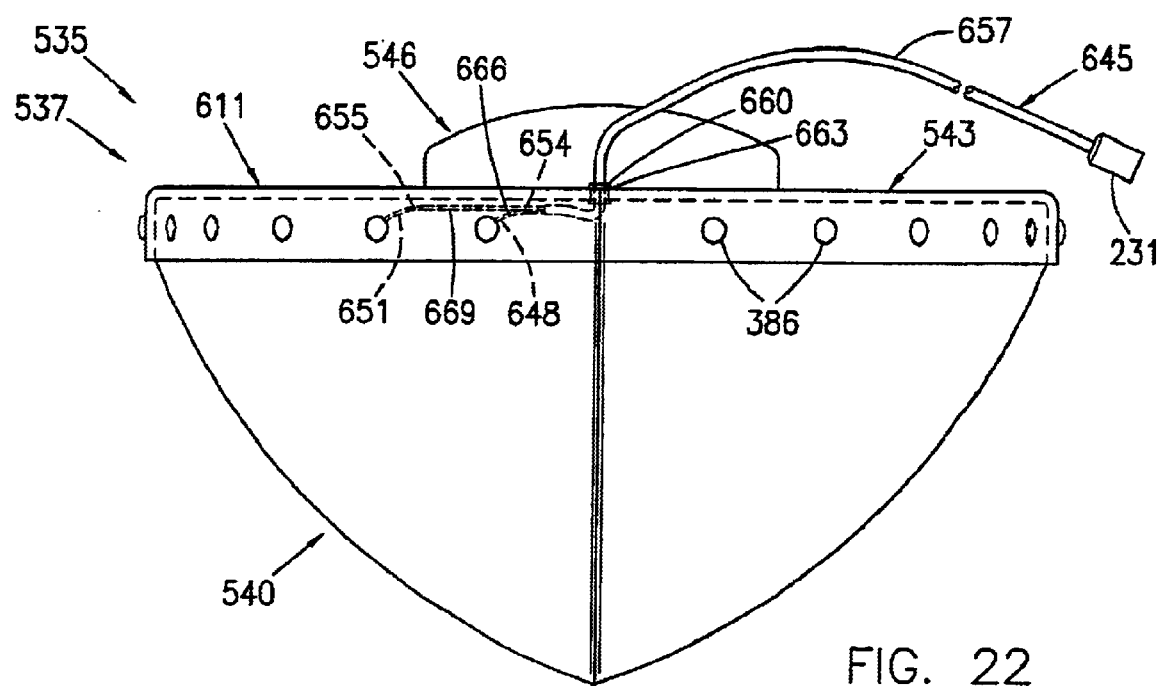
Figure 23:
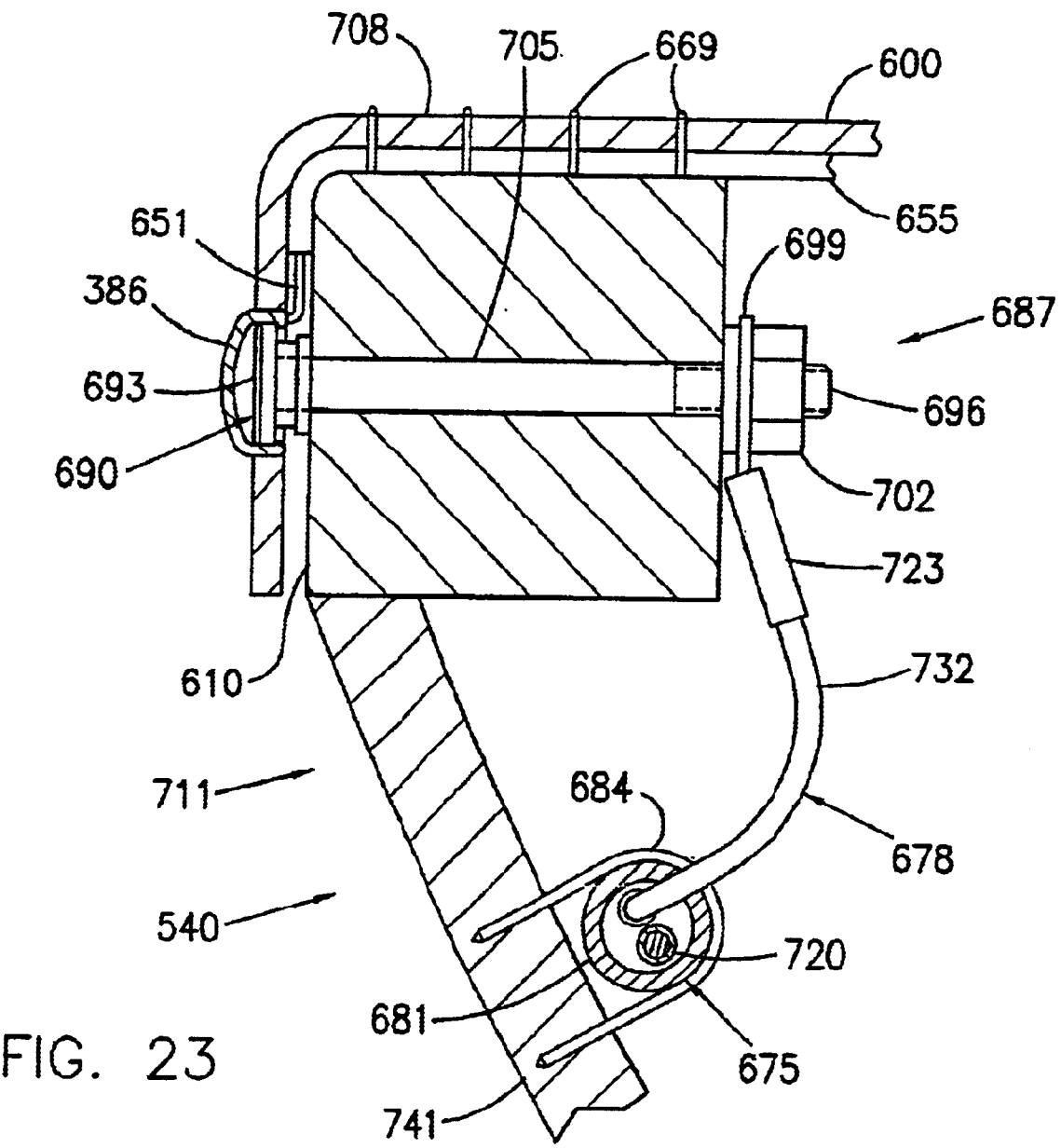
Figure 25:
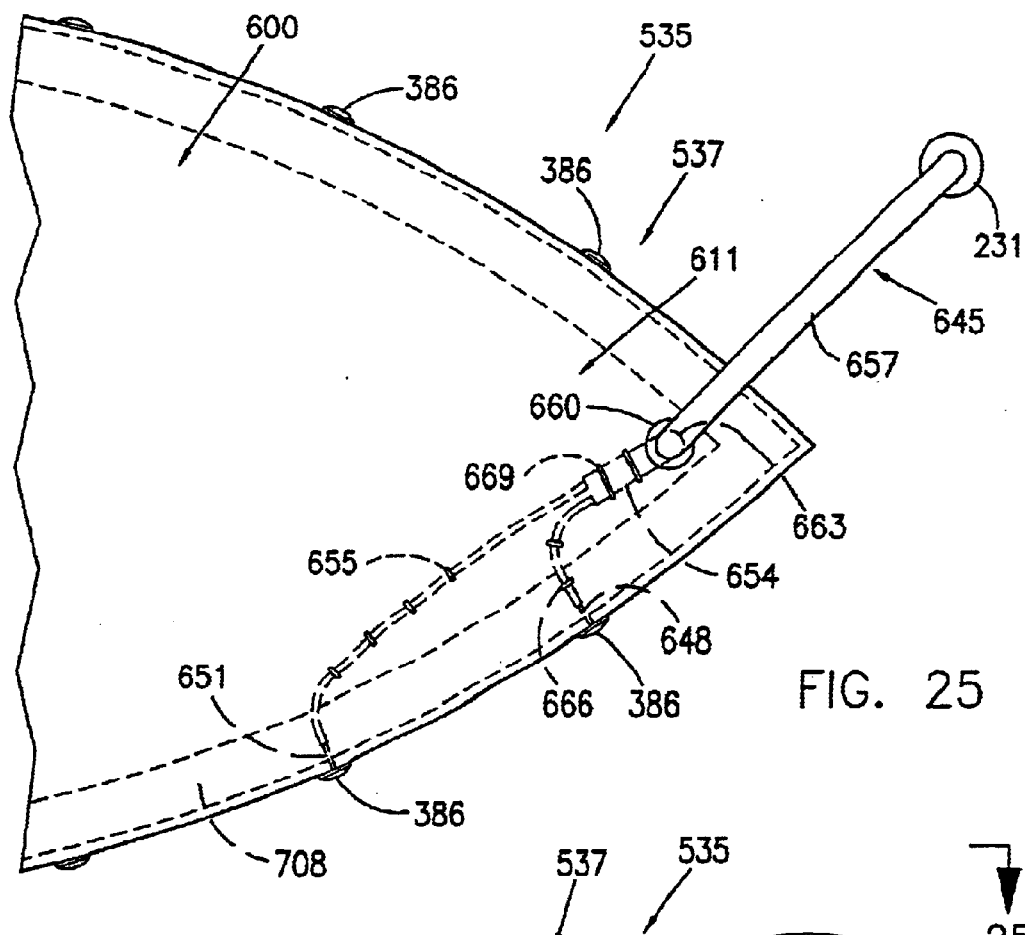
Figure 24:
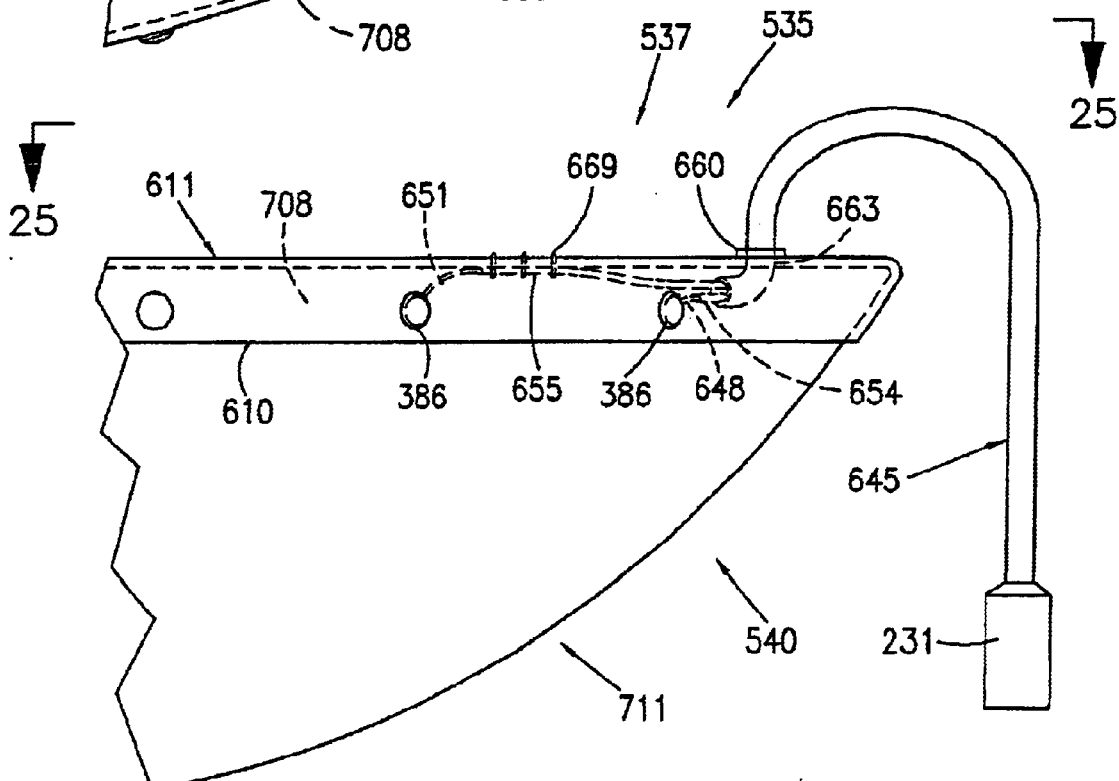

The best mode presently contemplated for carrying out the invention is illustrated in the accompanying drawings, in which:

FIG. 1 is a fragmentary perspective view of a first embodiment warning light system of the invention as mounted to a the stern of a trailered ski boat, comprising a first version pod, a hood, and a first version boat cover;

FIG. 2, a lateral vertical sectional view taken on the line 2—2 of FIG. 1 showing the inside of the casing with partitioning walls, the reflective center divider, the light sockets, the light bulbs, and the wire harness;

FIG. 3, a longitudinal vertical sectional view taken on the line 3—3 of FIG. 1 showing the running light and brake light compartments, the access door, the adjustable height mounting brackets, the tapered hood, and the tapered break away sections of a side wall of the hood;

FIG. 4, a fragmentary longitudinal vertical sectional view, to an enlarged scale, corresponding to FIG. 3 showing the details of the attachment and sealing of the access door and the attachment of the adjustable height mounting brackets;

FIG. 5, a fragmentary side elevational corresponding to FIG. 3, wherein the pod is in a lowered mounting position with several tapered break away sections of the side walls removed to permit such lowered position;

FIG. 6, a lateral vertical sectional view taken on the line 6—6 of FIG. 3, showing the hinged mounting of the hood and the access door to the shell and the height adjustment slots of the mounting brackets;

FIG. 7, a fragmentary longitudinal vertical sectional view, to an enlarged scale, taken on the line 7—7 of FIG. 6 further showing the details of the attachment and sealing of the access door, and the adjustable height mounting brackets to the shell;

FIG. 8, a fragmentary side elevational view, to an enlarged scale, showing the hinging operation of the hood and the access door to the casing;

FIG. 9, a fragmentary view, to an enlarged scale, of the typically configuration of the hinges of the hood and the access door to the shell;

FIG. 10, a fragmentary perspective view of a second embodiment warning light system of the invention as mounted to a the stern of a trailered ski boat, comprising the first version pod and a standard type, second version boat cover;

FIG. 11, a fragmentary longitudinal vertical sectional view, to an enlarged scale, taken on the line 11—11 of FIG. 10 showing the installation of the first version pod to the boat by means of bolts which extend through bolt holes having punch out covers through the casing;

FIG. 12, a fragmentary perspective view of a third embodiment warning light system of the invention as mounted to a the stern of a trailered ski boat, comprising a second version pod, the hood, and a third version boat cover under which the electrical cord is routed;

FIG. 13, a lateral vertical sectional view taken on the line 13—13 of FIG. 12 showing the inside of the casing with the partitioning walls, the reflective center divider, the light sockets, the light bulbs, and the wire harness;

FIG. 14, a longitudinal vertical sectional view taken on the line 14—14 of FIG. 12 showing the running light and brake light compartments, the access door, the adjustable height mounting brackets, the tapered hood, and the tapered break away sections of a side wall of the hood;

FIG. 15, a fragmentary perspective view of a fourth embodiment warning light system of the invention as mounted to a the stern of a trailered ski boat, comprising a third version pod having an auxiliary power cord, the hood, and a fourth version boat cover;

FIG. 16, a lateral vertical sectional view taken on the line 16—16 of FIG. 15 showing the inside of the casing with the partitioning walls, the reflective center divider, the light sockets, the light bulbs, the wire harness, and the auxiliary power cord coiled within the hood;

FIG. 17, a longitudinal vertical sectional view taken on the line 17—17 of FIG. 15 showing the running light and brake light compartments, the access door, the adjustable height mounting brackets, the tapered hood, the tapered break away sections of a side wall of the hood, and the auxiliary power cord coiled within the hood;

FIG. 18, a fragmentary perspective view of a fifth embodiment warning light system of the invention as mounted to a the stern of a trailered sail boat, comprising a fourth version pod, the hood, and a fifth version boat cover having the first and second end portions of the electrical cord affixed thereto, with the middle portion of the electrical cord routed through the hull of the sailboat, wherein electrical current is conducted through the respective snap fasteners;

FIG. 19, a lateral vertical sectional view taken on the line 19—19 of FIG. 18 showing the inside of the casing with the partitioning walls, the reflective center divider, the light sockets, the light bulbs, and the wire harness having a plurality of individual wires connected to a pair of individual insulated electrical wires comprising common wires of the electrical cord;

FIG. 20, a longitudinal vertical sectional view taken on the line 20—20 of FIG. 18 showing the running light and brake light compartments, the access door, the adjustable height mounting brackets, the tapered hood, the tapered break away sections of a side wall of the hood, and the individual wires of the wire harness connected to the common wires of the electrical cord;

FIG. 21, a perspective view of the fifth embodiment warning light system, to a reduced scale, as mounted to a the stern of a trailered ski boat, showing the first and second end portions of the electrical cord affixed to the fifth version boat cover, the middle portion of the electrical cord routed along the length of the inner periphery of the hull, and the plurality of snap fasteners including those used for electrical connections;

FIG. 22, a front elevational view taken on the line 22—22 of FIG. 21, showing the connection of the second end portion of the electrical cord to the flexible sheet and snap fasteners of the fifth version boat cover;

FIG. 23, a fragmentary, generally longitudinal vertical sectional view, to an enlarged scale, taken on the line 23—23 of FIG. 21, showing the electrically conductive snap members extending through the boat hull and connected to the common wires of the middle portion of the electrical cord;

FIG. 24, a fragmentary, oblique side elevational view, to an enlarged scale, taken on the line 24—24 of FIG. 21, further showing the connection of the second end portion of the electrical cord to the sheet and snap fasteners of the fifth version boat cover; and FIG. 25, a fragmentary top plan view taken on the line 25—25 of FIG. 24, further showing the routing of the common wires of the second end portion of the electrical cord from the snap fasteners to the electrical plug.

DETAILED DESCRIPTION OF THE ILLUSTRATED EMBODIMENTS

Referring to FIGS. 1–9, therein is shown a first embodiment rear warning light system of the invention, warning light system 18, which comprises a first version rear brake light and turn signal pod 20, and a first version boat cover 21, as installed to a trailered structure comprising a ski boat 23.

Pod 20 comprises a light pod assembly 26 and a hood 29. Light pod assembly 26 includes a casing 32, a means for producing light comprising a light assembly 35, and a means for mounting pod 20 to boat 23 comprising a plurality of bracket assemblies 38.

Casing 32 comprises a shell 41, a reflective center divider 44, a front access door 47, and a resilient sealing gasket 48. Shell 41 includes a transparent or translucent rear wall 50, a dependent arcuate top wall 53, a dependent bottom wall 56, respective dependent side walls 59 and 62, respective vertical half walls 65 and 68, and horizontal half wall 71. A pair of bolt support tubes 74 and 77 are integrally molded with bottom wall 56 and vertical half walls 65 and 68, respectively, and a bolt support tube 80 is integrally molded with horizontal half wall 71, all of which extend from rear wall 50 through shell 41. Respective bolt receiving holes 83, 86, and 89 extend through bolt support tubes 74, 77, and 80, having respective counterbored ends 92, 95, and 98 covered by respective integral removable covers 101, 104, and 107. A plurality of alignment tabs 110 are integrally molded with shell 41 with respective guide surfaces 113 thereof disposed in a plane "P" along with respective forward edges 116 and 119 of respective vertical half walls 65 and 68 and forward edge 121 of horizontal half wall 71. An inwardly directed front lip 122 at a front edge 125 of shell 41 includes a plurality of screw receiving holes 128 disposed thereabout. An integral upper hinge tab 131 extends from top wall 53 and a plurality of integral lower hinge tabs 134 extend from bottom wall 56, both at front edge 125 of shell 41. Shell 41 defines a brake light chamber 137, a parking light chamber 140, a right turn signal light chamber 143, and a left turn light chamber 146. A logo (not shown) can such as indicating the brand of boat 23 or a warning such as "stop" can be molded into and/or painted onto rear wall 50 adjacent brake light chamber 137. A pair of integral break-away alignment tabs 152 and 155 extend from bottom wall 56 at edge 125 of shell 41, alignment tabs 152 and 155 which include respective transverse walls 158 and 161 having respective perforated or scored break lines 164 and 167, and respective support gussets 170 and 173 which are separate from bottom wall 56 such that alignment tabs 152 and 155 can be removed by bending along the respective break lines 164 and 167.

Reflective center divider 44 comprises a flat body 176 and a reflective metal foil sheet 179 which is affixed thereto such as by adhesive bonding. A plurality of notched holes 182, 185, 188, 191, and 194 extend through center divider 44. Center divider 44 fits within shell 41 with foil sheet 179 in plane "P" juxtaposed guide surfaces 113 of alignment tabs 110 and forward edges 116 and 119 of respective vertical half walls 65 and 68 and forward edge 95 of horizontal half wall 71.

Front access door 47 comprises a flat body 197 of such configuration as to closely fit adjacent front lip 122 of shell 41 and includes an integral plug 198 which covers a hole 199 therethrough (FIG. 13), and a plurality of hinge tabs 200 which extend from a lower edge 203 of body 197. Access door 47 hingedly connects to shell 41 by means of respective bolts 206 which extend through tabs 134 and 200 of shell 41 and access door 47, respectively, and secured by means of locknuts 209. Access door 47 is secured to shell 41 by means of a plurality of screws 212 which extend through a plurality of holes 215 through body 197 threading into respective holes 128 of shell 41, with sealing gasket 48 therebetween to seal out water. A screw 218 extends through a hole 221 of a plurality of holes 221, 224, and 227 which line up with respective bolt receiving holes 83, 86, and 89 of support tubes 74, 77, and 80, threading into hole 89 of support tube 80 to further retain access door 47. Shell 41, reflective center divider 44, and a front access door 47 are typically molded from a thermoplastic or thermoset plastic material such as by injection molding, with sealing gasket 48 typically being made of rubber or other such waterproof gasketing material.

Light assembly 35 comprises a plurality of light bulbs 228, sockets 229, a wire harness 230, and an electrical plug 231. Light bulbs 218 twist-lock into sockets 221, which snap-fit or twist-lock into respective holes 182, 185, 188, 191, and 194 through reflective center divider 44. Wire harness 230 comprises a plurality of individual insulated electrical wires 232, 233, 236, 239, 242, 245, 248, 251, 254, and 257 which extend from respective sockets 221 into a flexible tube 260 of wire harness 224, closely passing through a resilient sealing grommet 263 disposed in a hole 266 in bottom wall 56 of shell 41 exposed by removing an integral plug 269 (FIG. 12) and which are connected to electrical plug 231 for connection to the electrical system of a motor vehicle (not shown) towing a trailer (not shown) carrying ski boat 23 or to the electrical system of the trailer which connects to the electrical system of the motor vehicle.

Pod 20 attaches to rear upper surface 272 of boat 23 using mounting bracket assemblies 38 each of which comprise an L-shaped bracket 275 having respective dependent horizontal and vertical legs 278 and 281, a threaded metal stud 284 pressfit into one of a pair of respective counterbored holes 287 and 290 through access door 47, a wingnut 293, and a pair of mating adhesive backed patches of hook and loop fastener 296 and 299, such as that widely known in industry as Velcro™. Studs 284 can also be integrally molded with access door 47 or adhesively affixed thereto. Studs 284 extend through respective slots 302 of vertical legs 281 of brackets 275 which are secured to access door 47 by means of wingnuts 293. The pairs of mating adhesive backed patches of hook and loop fastener 296 and 299 are adhesively attached, respectively, to horizontal legs 278 of brackets 275 and to rear upper surface 272 of ski boat 23 at the stern 305 thereof with transverse walls 158 and 161 of respective alignment tabs 152 and 155 juxtaposed a rear surface 308 of a transom 309 of ski boat 23.

Hood 29 is generally hollow, comprising a downwardly sloping top wall 311 having a pair of rearwardly disposed hinge tabs 314 which extend from a rear edge 317 thereof, and a pair of downwardly dependent, vertically tapered side walls 320 and 323 having respective front portions 326 and 329 which taper generally to a laterally arcuate pointed front edge 332 of top wall 311 with a longitudinally disposed hole 333 therethrough and respective rear portions 335 and 338 having respective rear edges 341 and 344, respective vertical slots 345 and 346, hood 29 having an open rear portion 347. Side walls 320 and 323 include a plurality of respective perforated or scored break lines 350 and 353 with respective triangular breakaway tabs 356 and 359 therebetween. Side walls 320 and 323 are thus adaptable to fit the height of casing 32 and the contour of rear upper surface 272 of ski boat 23 by cutting, repeatedly bending to fracture, or otherwise breaking away one or more break-away tabs 356 and 359 along the respective break lines 350 and 353 of side walls 320 and 323. Hood 29 hingedly connects to shell 41 by means of a bolt 206 which extends through tabs 131 and 314 of shell 41 and hood 49, respectively, and is secured by means of a locknut 209. Hood 29 mounts to rear upper surface 272 of boat 23 by means of a pair of mating adhesive backed patches of hook and loop fastener 368 and 371, such as that widely known in industry as Velcro™. The pairs of mating adhesive backed patches of hook and loop fastener 368 and 371 are adhesively attached, respectively, to a front bottom surface 374 of top wall 311 and to rear upper surface 272 of ski boat 23 ahead of stern 305 thereof. Hood 29 is typically molded from a thermoplastic or thermoset plastic material such as by injection molding.

Boat cover 21 comprises a sheet 380 having a pocket 383 both being made of a water resistant or waterproof material such as waterproofed canvas, a plurality of female snap fastener halves 386, and a pair of mating hook and loop fastener patches 389 and 392. Sheet 380 is of generally standard configuration to cover boat 23 with a plurality of female snap fastener halves 386 affixed thereto along an outer perimeter 393 thereof and includes a front portion (not shown) and a rear portion 395 to which pocket 383 is stitched at a seam 398. Rear portion 395 includes a hemmed edge portion 401 which includes a plurality of female snap fastener halves 386 which mate with respective male snap fastener halves (not shown) affixed to boat 23. Pocket 383 also includes a hemmed edge portion 404 having respective ends 407 and 410 which wrap under casing 32. Patch 389 is stitched to the underside 413 of hemmed edge portion 404 and patch 392 is adhesively affixed to rear upper surface 272 of boat 23. Pocket 383 permits boat cover 21 to closely fit over hood 29 and casing 32 so as to provide a more streamlined fit over light pod assembly 20.

Referring to FIGS. 10–11, therein is shown a second embodiment rear warning light system of the invention, warning light system 416, which comprises first version rear brake light and turn signal pod 20, and a standard type boat cover comprising second version boat cover 418, as installed to a trailered vehicle or other structure such as ski boat 23. Pod 20 attaches to the transom 309 of boat 23 by means of three elongate allen head bolts 419, which upon removal of respective covers 101, 104, and 107 of bolt receiving holes 83, 86, and 89, extend respectively therethrough into respective threaded inserts 422 affixed within transom 309. In such second mounting configuration, casing 32 typically does not function to retain a boat cover and as such is typically used with boat cover 418 which removably attaches to boat 23 by means of a plurality of mating female snap connector halves 386 which connect to a plurality of respective male snap connector halves (not shown) affixed to boat 23.

Referring to FIGS. 12–14, therein is shown a third embodiment rear warning light system of the invention, warning light system 426, which comprises a second version rear brake light and turn signal pod 428, and a third version boat cover 430, as installed to a trailered vehicle or other structure such as ski boat 23. Pod 428 comprises a light pod assembly 431 and hood 29.

Light pod assembly 431 includes casing 32, a means for producing light comprising a light assembly 434, and a means for mounting pod 428 to boat 23 comprising a plurality of bracket assemblies 38.

Light assembly 434 comprises a plurality of light bulbs 228, sockets 229, a wire harness 437, and electrical plug 231. Light bulbs 228 twist-lock into sockets 229, which snap-fit or twist-lock into respective holes 182, 185, 188, 191, and 194 through reflective center divider 44. Wire harness 437 comprises a plurality of individual insulated electrical wires 440, 443, 446, 449, 452, 455, 458, 461, 464, and 467 which extend from respective sockets 229 into a flexible tube 470 of wire harness 437, closely passing through resilient sealing grommet 263 disposed in hole 199 in front access door 47 exposed by removing integral plug 198, through hole 333 in front edge 332 of hood 29, and which are connected to electrical plug 231 for connection to the electrical system of a trailer (not shown) carrying ski boat 23.

Boat cover 430 comprises a sheet 476 having a pocket 479 both being made of a water resistant or waterproof material such as waterproofed canvas, a plurality of female snap fastener halves 386, a wire harness channel 480, and a pair of mating hook and loop fastener patches 389 and 392. Sheet 476 is of generally standard configuration to cover boat 23 with a plurality of female snap fastener halves 386 affixed thereto along an outer perimeter 481 thereof and includes a front portion (not shown) and a rear portion 482 to which pocket 479 is stitched at a seam 485. Rear portion 482 includes a hemmed edge portion 488 which includes a plurality of female snap fastener halves 386 which mate with respective male snap fastener halves (not shown) affixed to boat 23. Pocket 479 also includes a hemmed edge portion 492 having respective ends 495 and 498 which wrap under casing 32. Patch 389 is stitched to the underside 501 of hemmed edge portion 488 and patch 392 is adhesively affixed to rear upper surface 272 of boat 23. Pocket 479 permits boat cover 430 to closely fit over hood 29 and casing 32 so as to provide a more streamlined fit over pod 428. Wire harness channel 480 is formed around flexible tube 470 of wire harness 437 by means of a plurality of heavy cord stitches 504 which pass therearound and through sheet 476.

Referring to FIGS. 15–17, therein is shown a fourth embodiment rear warning light system of the invention, warning light system 506, comprising a third version rear brake light and turn signal pod 507 and first version boat cover 21, as installed to a trailered vehicle or other structure such as ski boat 23. Pod 507 comprises a light pod assembly 510 and hood 29. Light pod assembly 510 includes casing 32, a means for producing light comprising a light assembly 513, an auxiliary power cord assembly 516, and a means for mounting pod 507 to boat 23 comprising a plurality of bracket assemblies 38.

Power cord assembly 516 comprises a wire harness 519, and an electrical socket 522 such as that used in motor vehicles on cigarette lighters. Wire harness 519 comprises a pair of individual insulated electrical wires 525 and 528 which extend from socket 522 through a flexible tube 531 of wire harness 519, closely passing through a resilient sealing grommet 534 disposed in hole 199 (FIG. 13) in front access door 47 exposed by removing integral plug 198 (FIG. 2), and through flexible tube 260 of wire harness 224. Flexible tube 260 closely passes through resilient sealing grommet 263 disposed in a hole 266 in bottom wall 56 of shell 41 exposed by removing an integral plug 269 (FIG. 12). Individual wires 525 and 528 are connected to electrical plug 227 for connection to the electrical system of a trailer (not shown) carrying ski boat 23. Flexible tube 531 containing individual wires 252 and 528 can be positioned so as to extend through slot 345 of side wall 320, as shown, or through slot 346 of side wall 323 of hood 29 such that electrical power can be supplied to charge the battery (not shown) of the boat 23 or to power an electrically operated device such as an air pump for filling pneumatic tires.

Pod 507 can be used with a standard waterproof canvas or other such boat cover (not shown) or with the one specially designed for use therewith such as boat cover 21, with flexible tube 531 containing individual wires 525 and 528 which can extend through canvas sheet 380 between pocket 383 and respective ends 407 and 410 of hemmed edge portion 404 which wrap under casing 32 so as to supply electrical power to charge the battery of the boat 23 or such electrically operated air pump or other such device.

A Referring to FIGS. 18–25, therein is shown a fifth embodiment rear warning light system of the invention, warning light system 535, comprising a fourth version rear brake light and turn signal pod 536 and a fourth version boat cover 537, as installed to a trailered vehicle or other structure such as a sail boat 540.

Pod 536 comprises a light pod assembly 549 and hood 29. Light pod assembly 549 includes casing 32, a means for producing light comprising a light assembly 552, and a means for mounting pod 536 to sail boat 540 comprising a plurality of bracket assemblies 38.

Light assembly 552 comprises a plurality of light bulbs 228, sockets 229, and a wire harness 555. Light bulbs 228 twist-lock into sockets 229, which snap-fit or twist-lock into respective holes 182, 185, 188, 191, and 194 through reflective center divider 44. Wire harness 555 comprises a plurality of individual insulated electrical wires 558, 561, 564, 567, 570, 573, 576, 579, 582, and 585 which extend from respective sockets 221, and a pair of common wires 588 and 591 to which wires 558, 564, 570, 576, and 582, and wires 561, 567, 573, 579, and 585 are respectively connected. Common wires 588 and 591 each extend through respective flexible tubes 594 of wire harness 555 which closely pass through a resilient sealing grommet 597 disposed in hole 199 (FIG. 13) in front access door 47 exposed by removing integral plug 198 (FIG. 2). Flexible tubes 594 containing common wires 588 and 591 extend, respectively, through slot 345 of side wall 320 and slot 346 of side wall 323 of hood 29 to supply electrical power from the electrical system of a trailer (not shown) Dung sail boat 540 to light bulbs 228 as will be explained subsequently.

Boat cover 537 comprises a sheet 600 having a pocket 603 both being made of a water resistant or waterproof material such as waterproofed canvas, a plurality of female snap fastener halves 386, an electrical cord assembly 606, and a pair of mating hook and loop fastener patches 389 and 392. Sheet 600 is of generally standard configuration to cover sail boat 540 with a plurality of female snap fastener halves 386 affixed thereto along an outer perimeter 610 thereof and includes a front portion 611 and a rear portion 612 to which pocket 603 is stitched at a seam 615. Rear portion 612 includes a hemmed edge portion 618 which includes a plurality of female snap fastener halves 386 which mate with respective male snap fastener halves 621 affixed to sail boat 540. Pocket 603 also includes a hemmed edge portion 624 having respective ends 627 and 630 which wrap under casing 32. Patch 389 is stitched to the underside 633 of hemmed edge portion 624 and patch 392 is adhesively affixed to rear upper surface 636 of sail boat 540. Pocket 603 permits boat cover 543 to closely fit over hood 29 and casing so as to provide a more streamlined fit over and retain pod 536 to boat cover 543.

Flexible tubes 594 containing common wires 588 and 591 extend from hood 29 under sheet 600, being affixed to sheet 600 such as by respective overlapping stitched sears 639 and 642. Common wires 588 and 591 are each electrically connected to one respective female snap fastener half 386 such as by soldering for purposes explained subsequently. Electrical cord assembly 606 comprises a wire harness 645 and electrical plug 231. Wire harness 645 includes a pair of individual insulated electrical wires 648 and 651 which each extend from and are electrically connected to one respective female snap fastener half 386 such as by soldering for purposes explained subsequently. Individual wires 648 and 651 are covered by respective flexible tubes 654 adjacent the respective female snap fastener halves 386, which individual wires 648 and 651 extend through a flexible tube 657 upwardly from under sheet 600 through a grommet 660 affixed in a hole 663 through sheet 600. The flexible tubes 654 with respective individual wires 648 and 651 are affixed to sheet 600 such as by respective overlapping stitched seams 666 and 669, with individual wires 648 and 651 being connected to electrical plug 231 for connection to the electrical system of a trailer (not shown) carrying sail boat 540.

Sail boat 540 is specially modified for use with boat cover 537 by means of a wire harness assembly 672 which extends the length of sail boat 540. Wire harness assembly 672 comprises a pair of individual wire assemblies 675 and 678, a flexible tube 681, a plurality of staples 684, and a plurality of modified male snap connector half assemblies 687. Each of snap connector half assemblies 687 comprises an electrically conductive, elongate snap member 690 having a male snap connector head 693 and an elongate threaded body 696, a washer 699, and a locknut 702. Snap members 690 replace four of the standard male snap connector halves 621, with respective bodies 696 thereof extending through respective holes 705 through upper stringer member 708 of boat hull 711, and through respective holes 714 through transom 717 of boat hull 711. Individual wire assembly 675 comprises an individual insulated electrical wire 720 having a respective electrical connector 723 crimped to opposite stripped ends 726 and 729 thereof Individual wire assembly 678 comprises an individual insulated electrical wire 732 having a respective electrical connector 723 crimped to opposite stripped ends 735 and 738 thereof. Individual wires 720 and 732 are disposed inside flexible tube 681 which extends for the majority of the length thereof Respective electrical connectors 723 are connected to respective connector half assemblies 687 by means of washers 699, and locknuts 672 which threadably engage the threaded bodies 696 of respective snap members 690, with flexible tube 681 containing individual wires 720 and 732 affixed to an inner surface 741 of boat hull 711 by means of staples 684.

Many variations of the rear brake light and turn signal pods of the invention are possible while staying within the same inventive concept. For example, the pod and hood can be a single piece rather than hingedly connected together. The shape of the pod and hood can be more flattened for a lower profile configuration. The lights can be of the strip light or rope light variety such as containing incandescent bulbs, or light emitting diodes connected in parallel or in series. The pod, hood, and cover can be adapted for use on just about any trailered vehicle including show cars, snowmobiles, jet skis, and motorcycles. Any number of light functions can be connected to the electrical system of the motor vehicle or the pod be totally independently powered such as by battery power internal to the pod or hood operated by a switch attached thereto.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A warning light system for attachment to a trailered vehicle or other such structure carried on a trailer, towed by a motor vehicle of the type which includes an electrical system with light functions, to warn motor vehicles approaching the rear of the trailered structure, the warning light system comprising a self-contained, portable pod removably mountable on a rear portion of the trailered structure, said pod comprising a casing having a shell with a light-passing rear portion, means for producing light within said casing so as to shine through said light passing rear portion, and means for removably mounting said pod, as an assembled unit, to the rear portion of the trailered structure, wherein the mounting means removably and non-permanently connects the pod to the rear portion of the trailered structure for temporary use during trailering thereof.

2. A warning light system according to claim 1, wherein the mounting means includes at least one pair of patches of mating hook and loop fastener material, one of said patches of said pair which adhesively attaches to the rear portion of the trailered structure and the other of said patches of said pair which adhesively attaches to the casing.

3. A warning light system according to claim 1, wherein the casing is watertight.

4. A warning light system according to claim 3, wherein the casing includes an access door which connects to the shell with a means for sealing therebetween.

5. A warning light system according to claim 4, wherein the access door is hingedly connected to the shell, and the sealing means comprises a gasket which fits between the access door and the shell.

6. A warning light system for attachment to a trailered vehicle or other such structure carried on a trailer, towed by a motor vehicle of the type which includes an electrical system with light functions, to warn motor vehicles approaching the rear of the trailered structure, the warning light system comprising a pod removably mountable on a rear portion of the trailered structure which comprises a casing having a shell with a light-passing rear portion, means for producing light within said casing so as to shine through said light passing rear portion, and means for removably mounting said pod, as a unit, to the rear portion of the trailered structure, wherein the mounting means removably and non-permanently connects the pod to the rear portion of the trailered structure for temporary use during trailering thereof; a hood connectable to the casing, said hood having a top wall and a plurality of side walls downwardly dependent therefrom such that the hood is generally hollowed; and means for removably and non-permanently mounting said hood to the rear portion of the trailered structure forward of said casing.

7. A warning light system according to claim 6, wherein the mounting means includes at least first and second pairs of patches of mating hook and loop fastener material, one of said patches of said first and second pairs which adhesively attach to the rear portion of the trailered structure and the other of said patches of said first and second pairs which adhesively attaches respectively to the casing and to the hood.

8. A warning light system according to claim 6, wherein the hood is movable relative to the casing.

9. A warning light system according to claim 8, wherein the hood is hingedly connected to the casing.

10. A warning light system according to claim 6, wherein the light producing means includes an electrical cord having a first end portion which extends from the pod, a middle portion, and a second end portion connected to a plug removably connectable to the electrical system of the motor vehicle such that said light producing means works in unison with one or more light functions of the motor vehicle.

11. A warning light system for attachment to a trailered vehicle or other such structure carried on a trailer, towed by a motor vehicle of the type which includes an electrical system with light functions, to warn motor vehicles approaching the rear of the trailered structure, the warning light system comprising:

a pod mountable on a rear portion of the trailered structure which comprises a casing having a shell with a light-passing rear portion;

means for producing light within said casing so as to shine through said light passing rear portion;

means for mounting said casing by removably connecting said casing to the rear portion of the trailered structure;

a hood connectable to said casing;

means for removably mounting said hood to the rear portion of the trailered structure forward of said casing; and wherein said hood comprises a top wall and a plurality of side walls downwardly dependent therefrom, said side walls each of which include at least one lower break-away edge piece, and wherein said mounting means is of adjustable height to conform said pod to the configuration of the particular rear portion of the trailered structure and said break-away edge pieces can be removed as needed to likewise conform thereto.

12. A warning light system according to claim 11, wherein the hood is vertically tapered having opposing tapered side walls having the respective break-away edge pieces of tapered configuration.

13. A warning light system according to claim 11, wherein the mounting means is of adjustable height by means of a plurality of L-shaped brackets each of which include a slot and which are attachable to the casing using a hardware means.

14. A warning light system for attachment to a trailered vehicle or other such structure carried on a trailer, towed by a motor vehicle of the type which includes an electrical system with light functions, to warn motor vehicles approaching the rear of the trailered structure, the warning light system comprising:

a pod mountable on a rear portion of the trailered structure which comprises a casing having a shell with a light-passing rear portion;

means for producing light within said casing so as to shine through said light passing rear portion;

means for mounting said casing by removably connecting said casing to the rear portion of the trailered structure;

a hood connectable to said casing;

means for removably mounting said hood to the rear portion of the trailered structure forward of said casing and wherein said hood includes a top wall and a pair of vertically tapered side walls downwardly dependent therefrom.

15. A warning light system for attachment to a trailered vehicle or other such structure carried on a trailer, towed by a motor vehicle of the type which includes an electrical system with light functions, to warn motor vehicles approaching the rear of the trailered structure, the warning light system comprising:

a pod mountable on a rear portion of the trailered structure which comprises a watertight casing having a shell with a light-passing rear portion;

means for producing light within said casing so as to shine through said light passing rear portion; and means for mounting said casing to the rear portion of the trailered structure;

a hood connectable to said casing;

means for mounting said hood to the rear portion of the trailered structure forward of said casing;

wherein said light producing means includes an electrical cord having a first end portion which extends from said pod, a middle portion, and a second end portion connected to a plug removably connectable to the electrical system of the motor vehicle such that said light producing means works in unison with one or more light functions of the motor vehicle; and further comprising an auxiliary power cord having a first end portion electrically connected to said light producing means, a middle portion, and a second end portion electrically connected to a socket for supplying electrical power to an electrical device, said power cord and socket being stowable within the hood.

16. A warning light system for attachment to a trailered vehicle or other such structure carried on a trailer, towed by a motor vehicle of the type which includes an electrical system with light functions, to warn motor vehicles approaching the rear of the trailered structure, the warning light system comprising:

a pod mountable on a rear portion of the trailered structure which comprises a casing having a shell with a light-passing rear portion;

means for producing light within said casing so as to shine through said light passing rear portion;

means for mounting by removably connecting said casing to the rear portion of the trailered structure;

a hood connectable to said casing;

means for removably mounting said hood to the rear portion of the trailered structure forward of said casing;

wherein said light producing means includes an electrical cord having a first end portion which extends from said pod, a middle portion, and a second end portion connected to a plug removably connectable to the electrical system of the motor vehicle such that said light producing means works in unison with one or more light functions of the motor vehicle; and further comprising an auxiliary power cord having a first end portion electrically connected to said light producing means, a middle portion, and a second end portion electrically connected to a socket for supplying electrical power to an electrical device, said power cord and socket being stowable within said hood.

17. A warning light system for attachment to a trailered vehicle or other such structure carried on a trailer, towed by a motor vehicle of the type which includes an electrical system with light functions, to warn motor vehicles approaching the rear of the trailered structure, the warning light system comprising:

a pod mountable on a rear portion of the trailered structure which comprises a casing having a shell with a light-passing rear portion;

means for producing light within said casing so as to shine through said light passing rear portion;

means for mounting by removably connecting said casing to the rear portion of the trailered structure;

a hood connectable to said casing;

means for removably mounting said hood to the rear portion of the trailered structure forward of said casing;

wherein said light producing means includes an electrical cord having a first end portion which extends from said pod, a middle portion, and a second end portion connected to a plug removably connectable to the electrical system of the motor vehicle such that said light producing means works in unison with one or more light functions of the motor vehicle; and further comprising a boat cover which comprises a flexible, water resistant sheet having a front portion and a rear portion and being of such configuration as to cover the upper portion of a trailered structure comprising a boat, a plurality of means for fastening affixed thereto about an outer periphery thereof which are mateable with means for fastening affixed to an outer periphery of the boat to retain said sheet to the boat, and wherein said pod is connectable to said rear portion of said sheet, said electrical cord which extends from said pod along said sheet, the second end portion of said cord which extends outwardly from said front portion of said sheet such that said plug is attachable to the electrical system of the motor vehicle.

18. A warning light system according to claim 17, wherein the electrical cord is stitched an underside of the sheet to retain said electrical cord juxtaposed said sheet.

19. A warning light system according to claim 17, wherein the electrical cord includes a plurality of individual insulated electrical wires, the first end portion, the middle portion, and second end portion of said electrical cord being separate pieces containing respective first end portions, middle portions, and second end portions of said individual wires, one end of each of said individual wires of said first end portion being connected to the light producing means and a second end portion of each being connected to a respective fastening means of said boat cover at the rear portion thereof, one end of each of said individual wires of said second end portion being connected to the plug and a second end portion of each being connected to a respective fastening means of said boat cover at the front portion thereof, said middle portion of said electrical cord being fastenable within an inner perimeter of the hull of the boat with a first end of each of said individual wires of said middle portion being connectable to respective fastening means at a front portion of the hull and a second end of each of said individual wires being connectable to respective fastening means at a rear portion of the hull, and wherein when said boat cover is assembled to the boat, electrical connection is made between the plug and the light producing means of the pod, through the respective individual wires of said cord and said fastening means, to operate said light producing means in unison with one or more light functions of the motor vehicle.

20. A warning light system for attachment to a trailered vehicle or other such structure carried on a trailer, towed by a motor vehicle of the type which includes an electrical system with light functions, to warn motor vehicles approaching the rear of the trailered structure, the warning light system comprising a pod mountable on a rear portion of the trailered structure which comprises a casing having a shell with a light-passing rear portion, means for producing light within said casing so as to shine through said light passing rear portion, and means for mounting said casing to the rear portion of the trailered structure, wherein the mounting means includes a plurality of holes which longitudinally extend through at least a portion of the casing for bolt means to extend through into the rear of the trailered structure, said plurality of holes each extending through a reinforcing structure of the casing which extends generally through the casing, ad wherein said plurality of holes through the casing each include a countersunk end portion adjacent the light-passing rear portion of said casing being of such configuration to accept the head of a respective bolt means, said countersunk end portions being covered with respective removable covers of said shell.

21. A warning light system for attachment to a trailered vehicle or other such structure carried on a trailer, towed by a motor vehicle of the type which includes an electrical system with light functions, to warn motor vehicles approaching the rear of the trailered structure, the warning light system comprising a self-contained, portable pod removably mountable on a rear portion of the trailered structure, said pod comprising a casing having a shell with a light-passing rear portion, means for producing light within said casing so as to shine through said light passing rear portion, and means for removably mounting said pod, as an assembled unit, to the rear portion of the trailered structure, wherein the casing is watertight, said casing including an access door which connects to said shell with a means for sealing there between, and wherein the access door is hingedly connected to said shell, and said sealing means comprises a gasket which fits between said access door and said shell.

22. A warning light system for attachment to a trailered vehicle or other such structure carried on a trailer, towed by a motor vehicle of the type which includes an electrical system with light functions, to warm motor vehicles approaching the rear of the trailered structure, the warning light system comprising:

a pod mountable on a rear portion of the trailered structure which comprises a casing having a shell with a light-passing rear portion, means for producing light within said casing so as to shine through said light passing rear portion;

means for mounting said casing to the rear portion of the trailered structure, wherein the mounting means removably and non-permanently connects the casing to the rear portion of the trailered structure wherein said casing is watertight;

a hood connectable to the casing, said hood having a top wall and a plurality of side walls downwardly dependent therefrom such that said hood is generally hollowed; and means for mounting said hood to the rear portion of the trailered structure forward of said casing.

23. A warning light system according to claim 22, wherein the hood is movable relative to the casing.

24. A warning light system according to claim 23, wherein the hood is hingedly connected to the casing.

25. A warning light system according to claim 22, wherein the light producing means includes an electrical cord having a first end portion which extends from the pod, a middle portion, and a second end portion connected to a plug removably connectable to the electrical system of the motor vehicle such that said light producing means 692X works unison with one or more light functions of the motor vehicle.

26. A warning light system for attachment to a trailered vehicle or other such structure carried on a trailer, towed by a motor vehicle of the type which includes an electrical system with light functions, to warn motor vehicles approaching the rear of the trailered structure, the warning light system comprising:

a pod mountable on a rear portion of the trailered structure which comprises a watertight casing having a shell with a light-passing rear portion;

means for producing light within said casing so as to shine through said light passing rear portion;

means for mounting said casing to the rear portion of the trailered structure;

a hood connectable to said casing;

means for mounting said hood to the rear portion of the trailered structure forward of said casing; and wherein said hood comprises a top wall and a plurality of side walls downwardly dependent therefrom, said side walls each of which include at least one lower break-away edge piece, and wherein said mounting means is of adjustable height to conform said pod to the configuration of the particular rear portion of the trailered structure and said break-away edge pieces can be removed as needed to likewise conform thereto.

27. A warning light system according to claim 26, wherein the hood is vertically tapered having opposing tapered side walls having the respective break-away edge pieces of tapered configuration.

28. A warning light system according to claim 26, wherein the mounting means is of adjustable height by means of a plurality of L-shaped brackets each of which include a slot and which are attachable to the casing using a hardware means.

29. A warning light system according to claim 26, wherein the hood includes a top wall and a pair of vertically tapered side walls downwardly dependent therefrom.

30. A warning light system for attachment to a trailered vehicle or other such structure carried on a trailer, towed by a motor vehicle of the type which includes an electrical system with light functions, to warn motor vehicles approaching the rear of the trailered structure, the warning light system comprising:

a pod mountable on a rear portion of the trailered structure which comprises a watertight casing having a shell with a light-passing rear portion;

means for producing light within said casing so as to shine through said light passing rear portion;

means for mounting said casing to the rear portion of the trailered structure;

a hood connectable to said casing;

means for mounting said hood to the rear portion of the trailered structure forward of said casing;

wherein the light producing means includes an electrical cord having a first end portion which extends from said pod, a middle portion, and a second end portion connected to a plug removably connectable to the electrical system of the motor vehicle such that said light producing means works in unison with one or more light functions of the motor vehicle; and further comprising a boat cover which comprises a flexible, water resistant sheet having a front portion and a rear portion and being of such configuration as to cover the upper portion of a trailered structure comprising a boat, a plurality of means for fastening affixed thereto about an outer periphery thereof which are mateable with means for fastening affixed to an outer periphery of the boat to retain said sheet to the boat, and wherein the pod is connectable to said rear portion of said sheet, said electrical cord which extends from said pod along said sheet, the second end portion of said cord which extends outwardly from said front portion of said sheet such that said plug is attachable to the electrical system of the motor vehicle.

31. A warning light system according to claim 30, wherein the electrical cord is crossover stitched an underside of the sheet to retain said electrical cord juxtaposed said sheet.

32. A warning light system according to claim 30, wherein the electrical cord includes a plurality of individual insulated electrical wires, the first end portion, the middle portion, and second end portion of said electrical cord being separate pieces containing respective first end portions, middle portions, and second end portions of said individual wires, one end of each of said individual wires of said first end portion being connected to the light producing means and a second end portion of each being connected to a respective fastening means of said boat cover at the rear portion thereof, one end of each of said individual wires of said second end portion being connected to the plug and a second end portion of each being connected to a respective fastening means of said boat cover at the front portion thereof, said middle portion of said electrical cord being fastenable within an inner perimeter of the hull of the boat with a first end of each of said individual wires of said middle portion being connectable to respective fastening means at a front portion of the hull and a second end of each of said individual wires being connectable to respective fastening means at a rear portion of the hull, and wherein when said boat cover is assembled to the boat, electrical connection is made between the plug and the light producing means of the pod, through the respective individual wires of said cord and said fastening means, to operate said light producing means in unison with one or more light functions of the motor vehicle.

\* \* \* \* \*